(12) United States Patent
Subbaraman et al.

(10) Patent No.: US 9,255,334 B2
(45) Date of Patent: Feb. 9, 2016

(54) HYDROGEN EVOLUTION REACTION CATALYST

(71) Applicant: UChicago Argonne LLC, Chicago, IL (US)

(72) Inventors: Ram Subbaraman, Westmont, IL (US); Vojislav Stamenkovic, Naperville, IL (US); Nenad Markovic, Hinsdale, IL (US); Dusan Tripkovic, Hinsdale, IL (US)

(73) Assignee: UChicago Argonne, LLC, Chicago, IL (US)

( * ) Notice: Subject to any disclaimer, the term of this patent is extended or adjusted under 35 U.S.C. 154(b) by 13 days.

(21) Appl. No.: 13/664,122

(22) Filed: Oct. 30, 2012

(65) Prior Publication Data

US 2014/0116890 A1 May 1, 2014

(51) Int. Cl.
*C25B 11/04* (2006.01)
*C25B 1/04* (2006.01)
*C25B 9/06* (2006.01)

(52) U.S. Cl.
CPC .............. *C25B 11/0447* (2013.01); *C25B 1/04* (2013.01); *C25B 9/06* (2013.01); *C25B 11/0452* (2013.01); *C25B 11/0457* (2013.01); *Y02E 60/366* (2013.01)

(58) Field of Classification Search
CPC .......... C25B 1/04–1/12; C25B 11/04–11/0473
USPC .................................................. 205/628–639
See application file for complete search history.

(56) References Cited

U.S. PATENT DOCUMENTS

| 4,000,048 | A | * | 12/1976 | Bianchi et al. | 205/616 |
| 5,681,445 | A | * | 10/1997 | Harrison et al. | 205/445 |
| 6,517,802 | B1 | * | 2/2003 | Xiao et al. | 423/592.1 |
| 2010/0084282 | A1 | * | 4/2010 | Ganley et al. | 205/631 |
| 2013/0089739 | A1 | * | 4/2013 | Polshettiwar et al. | 428/402 |

OTHER PUBLICATIONS

Hall, Plasma-Sprayed Nickel Cathode Coatings for Hydrogen Evolution in Alkaline Electrolytes, J. of Applied Electrochem. 14, 107-115, (1984).*
Subbaraman et al., Enhancing Hydrogen Evolution Activity in Water Splitting by Tailoring Li+-Ni(OH)2-Pt Interfaces, Science 334, 1256 (2011).*
Arenz et al., "The effect of the particle size on the kinetics of CO electrooxidation on high surface area Pt catalysts," Journal of the American Chemical Society, vol. 127, 2005, pp. 6819-6829.
Balasubramanian et al., "X-ray absorption spectroscopy study of the local structure of heavy metal ions incorporated into electrodeposited nickel oxide films," Journal of the Electrochemical Society, vol. 146, No. 2, 1999, pp. 607-614.
Campbell, "Bimetallic surface chemistry," Annual Review of Physical Chemistry, vol. 41, 1990, pp. 775-837.

(Continued)

*Primary Examiner* — James Lin
*Assistant Examiner* — Ho-Sung Chung
(74) *Attorney, Agent, or Firm* — Foley & Lardner LLP

(57) ABSTRACT

Systems and methods for a hydrogen evolution reaction catalyst are provided. Electrode material includes a plurality of clusters. The electrode exhibits bifunctionality with respect to the hydrogen evolution reaction. The electrode with clusters exhibits improved performance with respect to the intrinsic material of the electrode absent the clusters.

15 Claims, 20 Drawing Sheets

(56) References Cited

OTHER PUBLICATIONS

Conway and Tilak, "Interfacial processes involving electrocatalytic evolution and oxidation of $H_2$, and the role of chemisorbed H," Electrochemica Acta, vol. 47, 2002, pp. 3571-3594.

Fu et al., "Active nonmetallic Au and Pt species on ceria-based water-gas shift catalysts," Science, vol. 301, No. 5635, 2003, pp. 935-938.

Greeley et al., "Computational high-throughput screening of electrocatalytic materials for hydrogen evolution," Nature Materials, vol. 5, Nov. 2006, pp. 909-913.

Greeley et al., "Hydrogen evolution over bimetallic systems: understanding the trends," ChemPhysChem, vol. 7, 2006, 1032-1035.

Han et al., "Hydrogen evolution reaction on amorphous Ni—S—Co alloy in alkaline medium," International Journal of Hydrogen Energy, vol. 28, 2003, pp. 1345-1352.

Henderson, "The interaction of water with solid surfaces: fundamental aspects revisited," Surface Science Reports, vol. 46, 2002, pp. 1-308.

Jaramillo et al., "Identification of active edge sites for electrochemical $H_2$ evolution from $MoS_2$ Nanocatalysts," Science, vol. 317, Jul. 2007, pp. 100-102.

Knudsen et al., "Low-Temperature CO Oxidation on Ni(111) and on a Au/Ni(111) Surface Alloy," ACS Nano, vol. 4, No. 8, pp. 4380-4387.

Los et al., "Hydrogen evolution reaction on Ni—Al electrodes," Journal of Applied Electrochemistry, vol. 23, 1993, p. 135-140.

Markovic and Ross, "Surface science studies of model fuel cell electrocaralysts," Surface Science Reports, vol. 45, 2002, pp. 117-229.

Markovic et al., "Hydrogen electrochemistry on platinum low-index single-crystal surfaces in alkaline solution," Journal of the Chemical Society, Faraday Transactions, vol. 92, No. 20, 1996, pp. 3719-3725.

Markovic et al., "Temperature-dependent hydrogen electrochemistry on platinum low-index single-crystal surfaces in acid solutions," Journal of Physical Chemistry B, vol. 101, 1997, pp. 5405-5413.

Merte et al., "Correlating STM contrast and atomic-scal structure by chemical modification: Vacancy dislocation loops on FeO/Pt(111)," Surface Science, vol. 603, 2009, pp. L15-L18.

Miousse and Lasia, "Hydrogen evolution reaction on $RuO_2$ electrodes in alkaline solutions," Journal of New Materials for Electrochemical Systems, vol. 2, 1999, pp. 71-78.

Parsons, "The rate of electrolytic hydrogen evolution and the heat of adsorption of hydrogen," Transactions of the Faraday Society, vol. 54, 1958, pp. 1053-1063.

Robinson, "Crystal truncation rods and surface roughness," Physical Review B, vol. 33, No. 6, Mar. 1986, pp. 3830-3836.

Rodriguez et al., "Activity of $CeO_x$ and $TiO_x$ Nanoparticles Grown on Au(111) in the Water-Gas Shift Reaction," Science, vol. 2123, Dec. 2007, pp. 1757-1760.

Russell and Rose, "X-ray absorption spectroscopy of low temperature fuel cell catalysts," Chemical Review, vol. 104, No. 10, 2004, pp. 4613-4635.

Stoffelsma et al., "Promotion of the Oxidation of Carbon Monoxide at Stepped Platinum Single-Crystal Electrodes in Alkaline Media by Lithium and Beryllium Cations," Journal of the American Chemical Society, vol. 132, No. 45, 2010, pp. 16127-16133.

Strmcnik et al., "Enhanced electrocatalysis of the oxygen reduction reaction based on patterning of platinum surfaces with cyanide," Nature Chemistry, vol. 2, 2009, pp. 880-885.

Strmcnik et al., "The role of non-covalent interactions in electrocatalytic fuel-cell reactions on platinum," Nature Chemistry, vol. 1, Sep. 2009, pp. 466-472.

Strmcnik et al., "Unique activity of platinum adislands in the CO electrooxidation reaction," Journal of the American Chemical Society, vol. 130, No. 46, 2008, pp. 15332-15339.

Subbaraman et al., "Three phase interfaces at electrified metal-solid electrolyte systems 1. Study of the pt(hkl)-nafion interface," Journal of Physical Chemistry C, vol. 114, No. 18, 2010, pp. 8414-8422.

Thiel and Madey, "The interaction of water with solid surfaces: Fundamental aspects," Surface Science Reports, vol. 7, 1987, pp. 211-385.

Tidswell et al., "Potential dependent structure of single crystal gold interfaces in alkaline electrolyte: an in situ X-ray scattering study," Surface Science, vol. 317, 1994, pp. 241-252.

\* cited by examiner

1 = 0.1M KOH
2 = 0.1M HClO₄
3 = Ni(OH)₂ modified

1 = 0.1M KOH
2 = 0.1M HClO$_4$
3 = Ni(OH)$_2$ modified

HYDROGEN EVOLUTION REACTION CATALYST

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The present invention generally relates to water electrolysis catalysts. More specifically, embodiments of the present invention relate to catalysts for use in the hydrogen evolution and oxygen evolution reactions in an alkaline environment.

BACKGROUND OF THE INVENTION

Growing concerns about global warming and energy security demand the expansion of renewable energy sources as viable alternatives to fossil-fuel-based technologies, in conjunction with improved energy storage options. In many of the innovative approaches to address these challenges, the production of hydrogen in various (photo)-electrolysis systems plays a pivotal role. Today, electrolytically produced hydrogen comes mainly from the chloralkali industry and water electrolysis. In water-alkali electrolysers (WAEs), for example, the cathodic-half cell reaction is the hydrogen evolution reaction (HER), the electrochemical transformation of water to molecular hydrogen and hydroxyl ions ($2H_2O+2e^- \leftrightarrow H2+2OH^-$). The mechanism of the HER is typically treated as a combination of three elementary steps: the Volmer step, water dissociation and formation of a reactive intermediate Had, ($2H_2O+M+2e^- \leftrightarrow 2M-H_{ad}+2OH^-$); followed by either the Heyrovsky step ($H_2O+H_{ad}-M+e^- \leftrightarrow M+H_2$) or the Tafel recombination step ($2M-H_{ad} \leftrightarrow 2M+H_2$). Adsorbed hydrogen species Had formed at potentials negative of the Nernst reversible potential for the HER is also referred to as overpotentially deposited hydrogen ($H_{opd}$). The different states of adsorbed hydrogen can also be referred, based on thermodynamic guidelines, as $H_{upd}$—the strongly adsorbed state and $H_{ad}/H_{opd}$—a weakly adsorbed state. Although the reactions pathways are similar, due to the activated water dissociation step the HER activities for most catalysts in alkaline medium are usually ~2-3 orders of magnitude lower than in acid solutions. The anodic-half cell reaction, the oxygen evolution reaction (OER), is a far more complex process, in which the hydroxyl ions generated at the cathode are consumed at the anode to produce oxygen and water molecules ($4OH^- \leftrightarrow O_2+2H_2O+4e-$). Given the harsh conditions associated with the OER, the choice of catalysts for electrolysis are typically noble metal oxides such as those of Ru, Ir and other forms of these. The poor conductivities and activities of the cheaper transition metal oxides such as that of 3d elements have limited their utilization in these systems. One way around it has been the use of high loadings of such materials.

Given that the supply of water is virtually inexhaustible, the hydrogen and oxygen production in WAEs can, in principle, be highly economical and almost limitless. In practice, however, large scale electrochemical production of hydrogen from water splitting is greatly constrained by two fundamental limitations: (1) the high overpotentials (defined as the difference between the reversible potential and the operating potential) of the HER and the OER in alkaline solutions, and (2) the lack of stability of electrode materials. The HER and the OER play key roles in a wide range of areas, including water and chlor-alkali electrolysis, metal deposition, corrosion, and fuel production from $CO_2$ reduction. The HER is also an electrochemical reaction of fundamental scientific importance, since the basic laws of electrode kinetics, as well as many modern concepts in electrocatalysis, were developed and verified by examining the reaction mechanisms related to the charge-transfer-induced conversion of protons (acid solutions) and water (alkaline solutions) to molecular hydrogen.

It is not clear why the rate of the HER is ~2 to 3 orders of magnitude lower at pH=13 than at pH=1, nor is it understood why the reaction is sensitive to the catalyst surface structure in alkaline media but largely insensitive in acids. A practical implication of the slow kinetics in alkaline solution is the lower energy efficiency for both water-alkali and chlor-alkali electrolyzers. For water-alkali electrolyzers, the high overpotentials for the oxygen evolution reaction (OER) at the anode also contribute significantly to overall energy losses. This has led to various approaches to identify catalysts for both OER and HER. However, rarely have these strategies for design of materials been based on molecular level understanding of the reaction pathways. In addition, the influence of non-covalent (Van der Waals type) interactions on the overall kinetics of the HER has been under explored, particularly in light of recent studies highlighting the impact of non-covalent interactions on the rates of many electrochemical reactions such as oxygen reduction reaction, CO and methanol oxidation reaction.

Design and synthesis of materials for efficient electrochemical transformation of water to molecular hydrogen and of hydroxyl ions to oxygen in alkaline environments is of paramount importance in reducing energy losses in water-alkali electrolysers. For decades, practical design of metal catalysts for the HER in acidic media has been based on the well-known concept of volcano plots. with rare exceptions, a classical volcano-shaped correlation is found from both experimental results as well as computational approaches; with metals that adsorb hydrogen neither too strongly nor too weakly (the Pt-group metals) occupying the top of volcano. While the metals that adsorb hydrogen too strongly (Ru, 3d-elements) are positioned on the descending part of the volcano, the IB group metals which exhibit a weak M-Had interaction on the ascending part. Similar plots also have been generated for the OER catalyst materials; for simple oxides, $RuO_2$ and $IrO_2$ exist at the apex of the volcano, with other transition metal oxides in both the ascending and descending portion of the curves. For more complex oxides, such as perovskites, similar positions exist with the metals in the 'B' site of the lattice determining the overall position in the volcano plot. One issue with the use of such volcano plots is the lack of clear information on active sites; for the theoretical calculation effort, ideal surfaces are used which seldom exist in reality. Similarly for experimentally derived, rarely are the materials well-defined, which results in several ambiguities due to the contributions from other factors such as defects, inhomogeneities etc. . . . .

A great many materials have been tested for the HER and the OER in alkaline environments, including various combinations of metals, metal alloys, simple oxides such as $RuO_2$/$IrO_2$ (refs 15,16), and more complex materials such as combinations of 3d oxides, sulphides, phosphates and perovskites. Currently, various combinations of metals (pt, Pd, Ir, Ru, Ag, Ni), metal alloys (Ni—Co, Ni—Mn, Ni—Mo), metal oxides (Ru02), and Ni-sulfides/Ni-phosphides are used to catalyze the conversion of $H_2O$ to $H_2$. Unfortunately, no current catalysts provide sufficient activity for hydrogen production (which is usually overcome with higher loading of these materials), thereby resulting in high overpotentials and energy losses. While most of the Pt group metals are good catalysts for the adsorption/recombination of the reactive hydrogen intermediates ($H_{ad}$), they are generally inefficient for the process of water dissociation. On the other hand, although metal oxides (and in some cases other compounds such as sulfides) are effective for cleaving the H—OH bond, they are highly ineffective in converting the resulting $H_{ad}$ intermediates to $H_2$. In addition, there are inherent issues with non-noble materials stemming from the decrease in activity during operation, arising from the formation of hydrides as well as the overall durability issues stemming from the dissolution of the catalyst materials during intermittent start-stop operations. Some of these issues have been overcome with alloying, in very high loadings of such catalyst materials (~25-40 times the equivalent for Pt) in order to achieve the desirable activity. Similarly for the OER, given the harsh conditions, the stability of the materials is critical. Given the relatively low stability of most of these materials, the norm of using higher loading is common. Also, the limitation with development of new catalysts for the OER is the lack of clear fundamental knowledge required to design new catalysts.

Although these materials have shown interesting variations in catalytic behavior from one catalyst to the next, all of the currently used catalysts operate at high overpotentials. One of the major reasons for the slow progress in finding improved catalysts in WAEs is that the selection of these materials has been guided by a purely trial-and-error and/or a combinatorial approach, and no studies focusing on a systematic understanding of trends in the fundamental, atomic-scale catalytic properties of these reactions on well-characterized materials have been established. Current state of the art materials including oxides and metal catalysts are seldom cost effective, with noble metals having high materials cost and oxides having high performance cost.

SUMMARY OF THE INVENTION

One embodiment of the invention relates to an electrode for use in the hydrogen evolution reaction. The electrode comprises an electrode metal. A plurality of metal (hydr)oxide clusters are deposited on the surface of the electrode metal. The electrode exhibits bifunctionality with respect to the hydrogen evolution reaction.

One embodiment of the invention relates to a electrolytic cell comprising an anode and a cathode. The cathode has a plurality of metal (hydr)oxide clusters deposited on the surface of the electrode metal. The electrolytic cell further comprises an electrolyte. The electrode exhibits bifunctionality with respect to the hydrogen evolution reaction.

One embodiment of the invention relates to a method of generating hydrogen. A cell is formed having a cathode, an anode, and an alkaline electrolyte. The cathode has a plurality of metal (hydr)oxide clusters deposited thereon. A current is applied to the cell. Disassociation of water and the production of hydrogen intermediates is facilitated at the plurality of metal (hydr)oxide clusters. Hydrogen intermediates are adsorbed to the cathode surface. Hydrogen intermediates are combined to form molecular hydrogen.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 5A-B illustrate the fundamental difference between the HER and the OER namely: HER is bi-functional reaction (requires two types of sites) and OER is monofunctional (requires one type of site)

DETAILED DESCRIPTION OF THE PREFERRED EMBODIMENTS

Figure 1A:
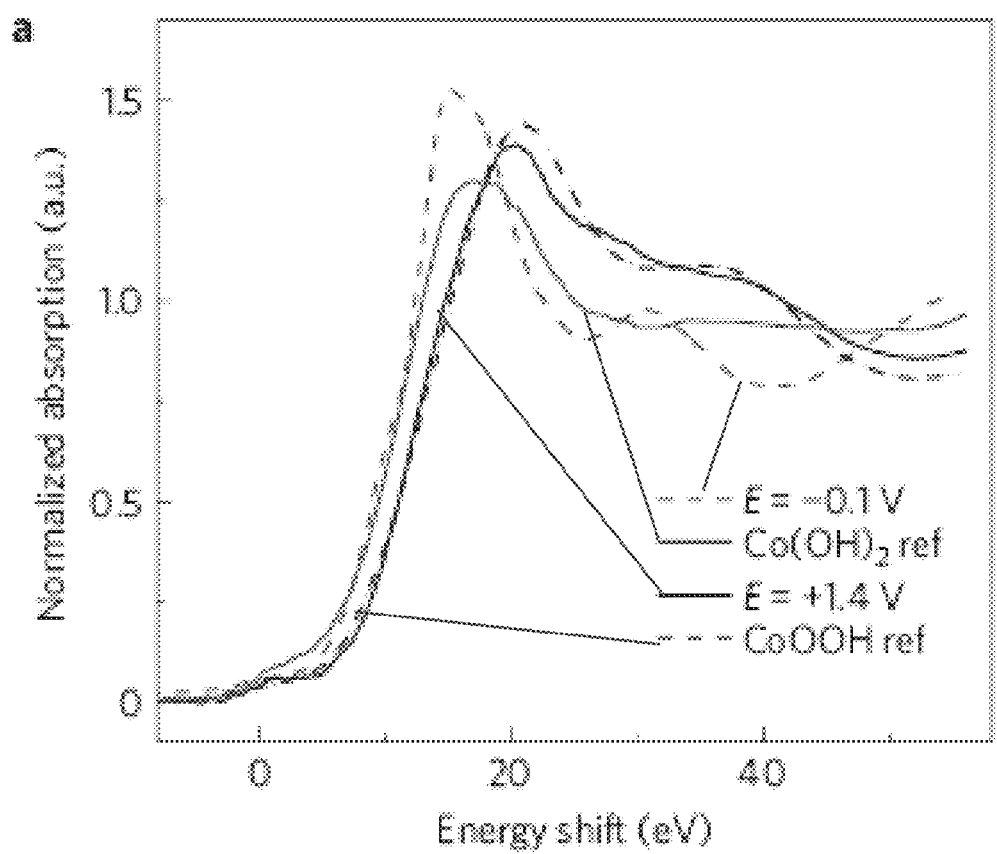
FIG. 1A illustrates sample XAS spectra for $Co^{2+\delta}O^\delta(OH)_{2-\delta}$ on Pt(111) surface for two different potentials E=−0.1 V and E=+1.4 V.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

HER catalyst activity varies depending on the pH of the Environment. Whereas in acid solutions the reaction is controlled mainly by the hydrogen recombination (the Tafel step), in alkaline solutions the kinetics are determined by a delicate balance between the water dissociation (the Volmer step) and concomitant interaction of water dissociation products with a surface. In one implementation, the present invention relates to systems and methods of tailoring a controlled and well characterized arrangement of metal (hydr)oxide clusters on electrode surfaces, such that an 2-8-fold increase in the activity of the HER relative to state-of-the-art metal and metal-oxide catalysts can be realized. The catalytic proficiencies of metals and metal oxides are combined by creating a bi-functional metal-oxide/metal material (metal oxides deposited on metal substrates) for the HER. In a bi-functional effect, the edges of the metal hydr(oxide) clusters promote the dissociation of water and the production of hydrogen intermediates that then adsorb ($H_{ad}$) on the nearby electrode surfaces and recombine into molecular hydrogen. The composite materials of certain embodiments facilitate different parts of the overall multistep HER process in alkaline environments: an oxide to provide the active sites for dissociation of water, and a metal to facilitate adsorption of the atomic hydrogen produced and its subsequent association to form $H_2$ from these intermediates. This bi-functionality within the catalyst material overcomes an otherwise a significant bottleneck in design active catalysts.

Figure 5A:
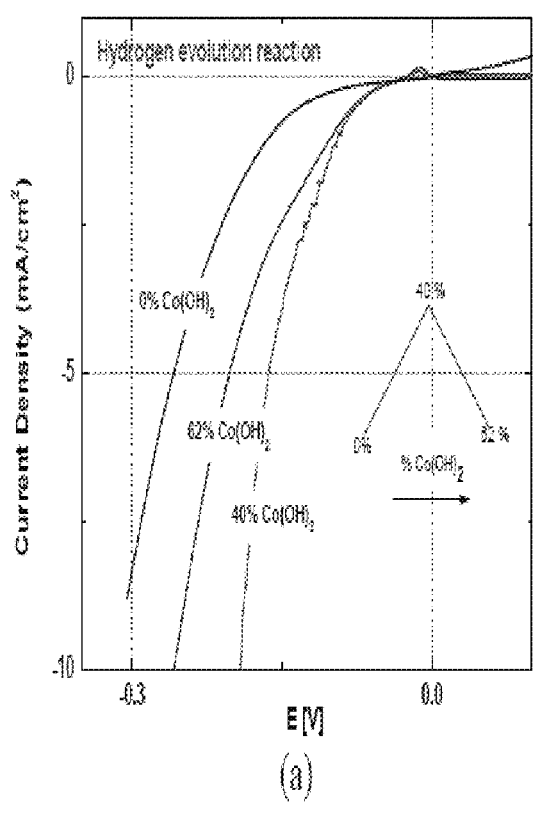
FIG. 5A illustrates a graph of HER activity as a function of three different coverages of $Co(OH)_2$%: (bare Pt(111) surface), 40% (low) and 62% (high)

In one embodiment, a material capable of disassociating water is deposited on the surface of an electrode material. In one embodiment, the disassociative material is a metal (hydr) oxide. Preferably, the materials is a 3-d transition metal (hydr) oxide, such as Ni(OH)$_2$. Facile water dissociation properties of Ni(hydroxy)oxides compared to other transition metal oxides have been well established but it should be appreciated that other materials for facilitating water dissociation may be utilized. Other materials such as other transition metal oxides, as well as any other metal-alloy oxides can also be employed. The range of elements include, but are not limited to, Ni, Co, Fe, Mn, Pb, Zn, Bi, Mo, Ru, Ir. In one implementation the Ni(OH)$_2$ is deposited as clusters—for example having a height of about 0.7 nm and a width of about 8 to about 10 nm—may be deposited. The preferred range for each implementation is dependent on the substrate, geometry, orientation etc. Typically clusters of 1-2 monolayers thick are preferred due to the enhanced conductivity of these sized clusters. The size of the clusters needs to be optimal to provide the activity without any stability issues. In one implementation the Ni(OH)$_2$ covers about 35% of the exposed electrode. The critical coverage needs to be determined as a function of both the base metal and the hydr(oxy)oxide clusters. As shown in FIG. 5A, there exists an optimal coverage for the HER. The relative coverages of the Ni(OH)$_2$ clusters is expected to be different between different elements, including elements within the same group (depending on oxophilicity, metal sites available etc. . . . ). It is believed there is little dependence on coverage at sufficient low current densities.

In one embodiment, specific electrolytes are utilized to provide additional improvement to the reaction kinetics. Also, not considering the role of electrolyte components such as the cations have also limited the extent of improvement achievable. In one implementation, the Had-generation step can be further enhanced via alkali-metal induced destabilization of the HO—H bond. For Li+, a 10-fold total increase in activity has been observed. The electrolyte containing cations which interact strongly with OH species can be helped to influence the kinetics. This would include and not limited to Ba, Ca, Mg, and maybe in some cases Al, Be. The main criteria for working is that these ions are stable and do not undergo any formation of oxide or deposition during the recation as that would poison the catalyst. As for the concentration, a whole range can be used from 0.001M to 1M for the electrolyte.

It should be appreciated that the development of active sites for water dissociation on well-defined single crystal surfaces can be fully translated to nanoscale systems. Further, systems may be synthesized by deposition of metal oxides including, but are not limited to, Co, Fe, Mn, Pb, Zn, Bi, Mo, Ru, Ir. and or a mixture of these oxides on a platinum or other noble metals such as Au, Ru, Ir etc. The metals range from 3d metals such as Ni, Co, Cu, Mn, Fe, Cr, as well as V, W, Ti, Pd. This approach is applicable for relatively all metals that are stable.

Activity for HER and OER in an Alkaline

Activity for HER and OER in an Alkaline electrolytes can be enhanced by using such an approach. The HER by using the advantage of bi-functional catalyst, and for the OER using the conductive hydr(oxy)oxides deposited on metal substrates. The metal substrate can be made from any metal which is relatively cheap and stable under the OER conditions.

In one embodiment, a stable metal substrate is made from a non-noble (cheap) metal core with a surface layer or two of the more stable metal in the OER region. A simple example will be using Fe/Cu core Au shell particle which can then be modified with hydr(oxy)oxide clusters to obtain the conductive/stable oxides for the HER/OER. For the case of the HER, the choice of the surface layer metal can be either Pt, Ir or Ni and for the OER the substrate could be Au, Ru, Ir etc.

Activity for HER and OER in an alkaline environment has not previously been characterized. Characterization was carried out using the well-characterized $M^{2+\delta}O^{\delta}(OH)_{2-\delta}$/Pt(111) catalyst surfaces (M D Ni, Co, Fe, Mn) to establish clear trends in activity for the HER and the OER of a complex oxide system. Here, using 3d-M hydr(oxy)oxides, with distinct stoichiometries and morphologies in the hydrogen evolution reaction (HER) and the oxygen evolution reaction (OER) regions, the overall catalytic activities for these reaction are established as a function of a more fundamental property, a descriptor, OH-M2C_ bond strength ($0 \leq \delta \leq 1:5$). This relationship exhibits trends in reactivity (Mn<Fe<Co<Ni), which is governed by the strength of the $OH-M_2C\_$ energetic (Ni<Co<Fe<Mn). These trends are found to be independent of the source of the OH, either the supporting electrolyte (for the OER) or the water dissociation product (for the HER). Using the $OH_{ad}-M^{2+\delta}$ interaction as the primary descriptor, it was observed that the activity for the HER (bi-functional) and the OER (monofunctional) for these 3d-M hydr(oxy)oxide systems follows the order Ni>Co>Fe>Mn. The increasing OER activities for the 3d-M systems (always greater than Pt), as a function of the decreasing strength of the $OH_{ad}-M^{2+\delta}$ interaction can be used to tune transition metal oxide catalysts for the OER. The successful identification of these electrocatalytic trends provides the foundation for rational design of 'active sites' for practical alkaline HER and OER electrocatalysts.

Electrode preparation: extended surface electrode preparation. Pt(111) and Au(111) electrodes were prepared by inductive heating for 15 min at ~1,100 K (1,000 K for Au) in an argon hydrogen flow (3% hydrogen) 35. Although preparation by inductive heating leads to formation of defects such as ad-islands on the surface, the number of such defects is low enough to be electrochemically invisible. The annealed specimens were cooled slowly to room temperature under an inert atmosphere and immediately covered with a droplet of deionized (DI) water. Electrodes were then assembled into a rotating disk electrode (RDE) ensemble. Voltammograms were recorded in argon-saturated electrolytes. The Ag/AgCl reference electrode was used, but all potentials in the paper are shown versus the reversible hydrogen electrode (RHE). Nanoparticles either synthesized in house or commercially acquired are then suspended in water at a concentration of 1 mg/ml or higher and then deposited onto a substrate such as glassy carbon and dried under Ar/H2 atmosphere. The loadings are chosen to range from 50 micrograms/cm2 to 1 mg/cm2 depending on the nature of materials.

Metal hydroxide deposition. All substrates considered in this work (freshly prepared extended surfaces, ad-island covered surfaces, as well as high-surface-area catalyst electrodes) were washed thoroughly and introduced into an electrolyte containing various concentrations of transition metal perchlorates/chlorides. Concentration ranges tested include 150_1,000 ppm. Following the introduction of the electrode, the oxide layers were then deposited either potentiostatically (held at potentials above 0.6 V) or by cycling between $H_{upd}$ and the $OH_{ad}$ regions. Typical coverages of 30-40% were obtained within 10 min of treatment. For higher coverages, higher concentrations as well as longer times were used. After deposition, the electrodes were rinsed and introduced into the clean electrochemical cell. The $H_{upd}$ of the modified surface is compared against that of the bare surface to estimate the effective surface coverage of the oxide species.

Chemicals. All alkali metal hydroxides and perchlorate salts used were obtained in the highest purity from Sigma Aldrich. Electrolytes used for our experiments, 0.1M KOH/LiOH, were prepared with Millipore DI water. All gases (argon, oxygen, hydrogen) were of 5N5 quality purchased from Airgas. A typical three-electrode fluoro ethylene propylene (FEP) polymer based cell was used to avoid contamination from glass components. Experiments were controlled using an Autolab PGSTAT 302N potentiostat. Gold or platinum wires were used as counter electrodes for studying hydrogen evolution reaction. Precautions were taken to prevent significant accumulation of dissolved counter electrode ions near the working electrode.

Electrochemical measurements. After extensive rinsing, the electrode was embedded into the RDE and transferred into a standard three-compartment electrochemical cell containing 0.1M KOH/LiOH (Sigma-Aldrich). In each experiment, the electrode was immersed at 0.05 V in a solution saturated with argon. After obtaining a stable cycle between 0.05 and 0.7 V the electrolyte was saturated with $H_2$, following which polarization curves for the HER were recorded on the disc electrodes between 0.05 V and −0.4 V. The lower potential limits were chosen so as to avoid significant bubble formation, as well as to minimize the extended dissolution of the counter electrode. The concentration of Pt after 1 h of HER measurements was found to be less than 1 ppm in the working electrode compartment. All polarization curves were corrected for the infrared contribution within the cell. OER measurements were carried out by cycling the electrode up to 1.7 V versus RHE. Potential hold experiments were also carried out for the oxide/Pt(111) systems to study the stability of the oxide clusters at these potentials, as well as for preparation of samples for the STM measurements.

XAS/XANES measurements. The X-ray absorption spectroscopy (XAS) data were acquired at bending magnet beamline 12-BM-B at the Advanced Photon Source (APS), Argonne National Laboratory. The synchrotron radiation was filtered by a double crystal Si(111) monochromator with a double mirror system for focusing and harmonic rejection. A custom-made in situ transmission electrochemical X-ray cell with a 6 mm diameter Pt(111) single crystal and Ag/AgCl reference electrode was used in a grazing incidence geometry. A 13-element Ge detector (CANBERRA) was used to measure the fluorescence yield. Z-1 filters and grazing incidence geometry was used to minimize the elastic scattering intensity. The monochrometer calibration was monitored by simultaneously measuring the same element reference foil in front of a Si diode and looking at the air-scattered beam. ±

Figure 1B:
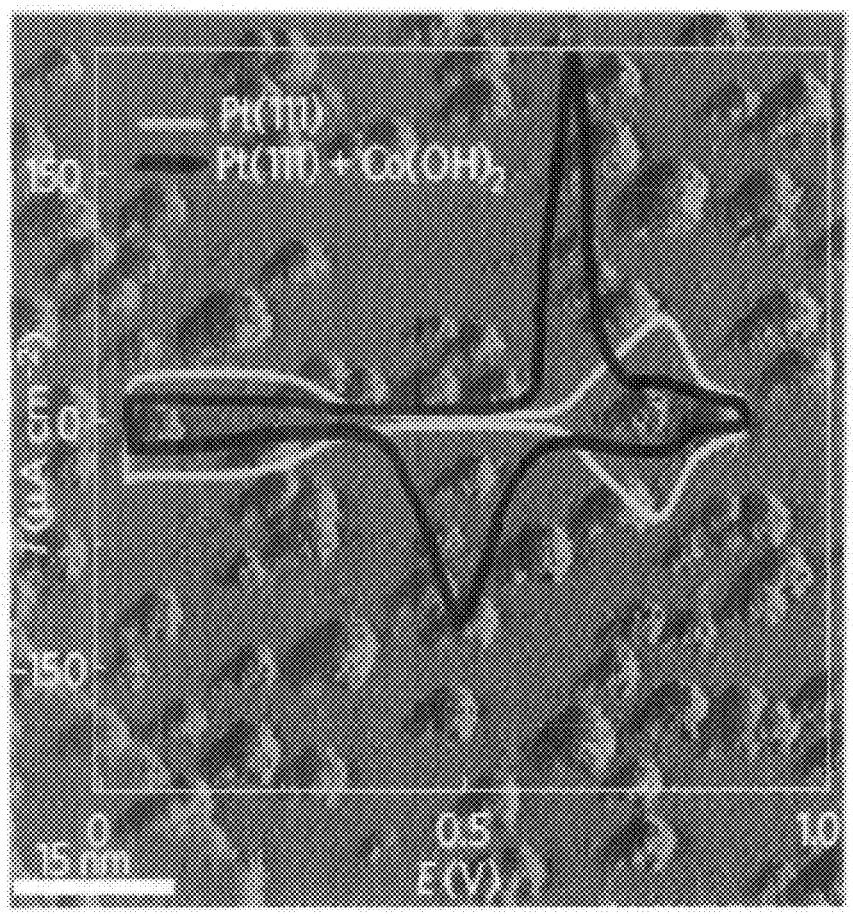
FIG. 1B is a STM for $Co(OH)_2$/Pt (111) in the HER region.
Figure 1C:
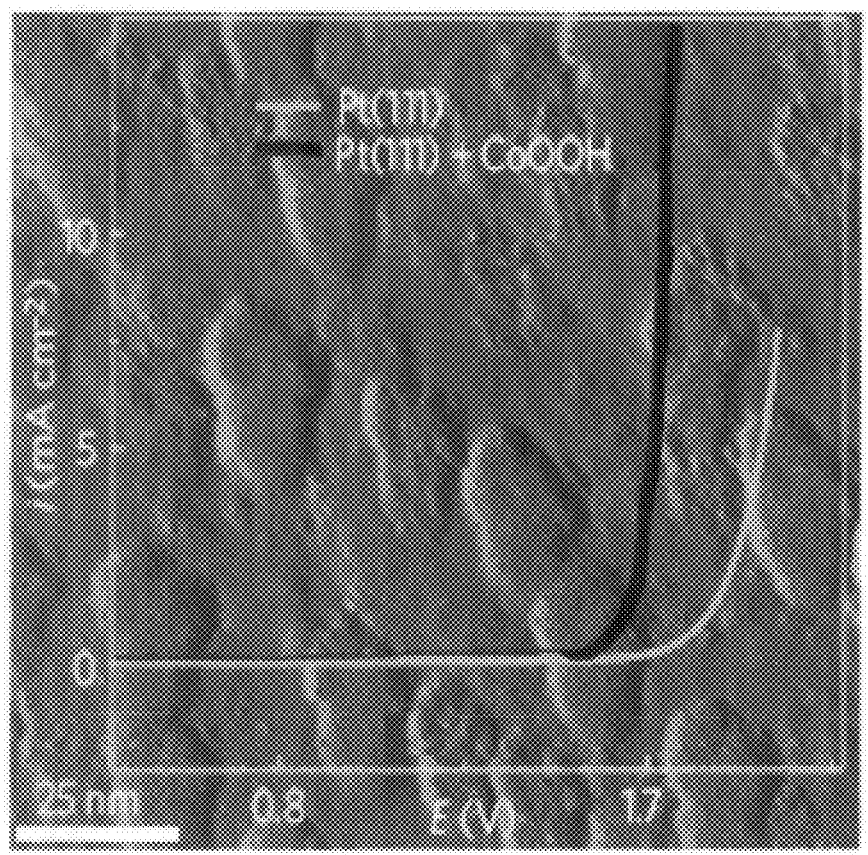
FIG. 1C is a STM for CoOOH/Pt (111) and includes the polarization curves for the OER.
Figure 1D:
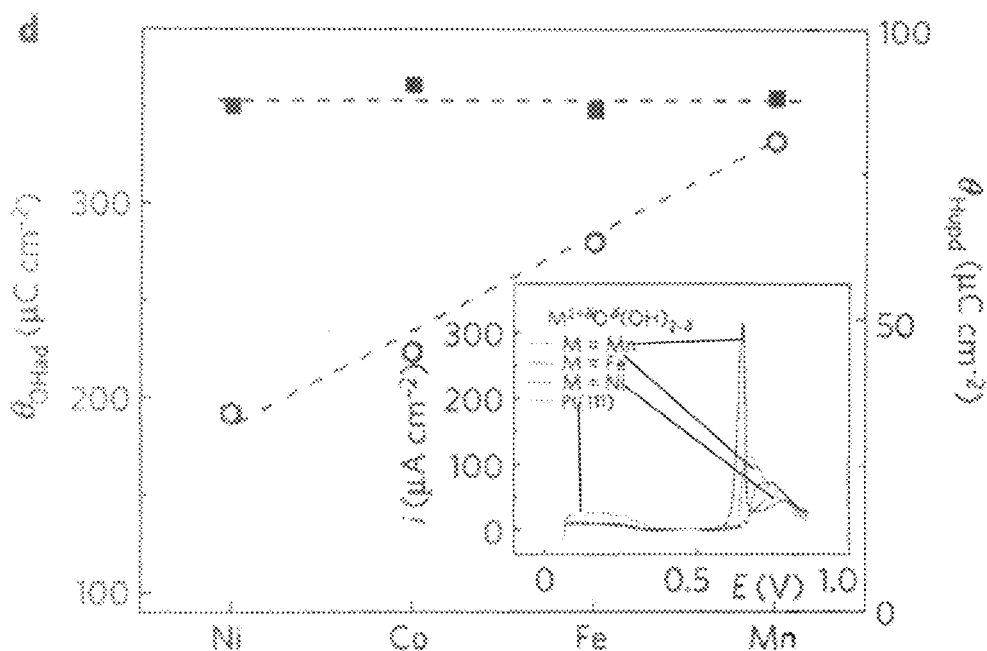
FIG. 1D is a comparison of $OH_{ad}$ charge as a function of oxophillicity of the metal oxide cation (M) for same coverages of the $M^{2+\delta}O^\delta(OH)_{2-\delta}$/Pt(111) surface.

X-ray absorption spectroscopy (XAS) data was collected and used to characterize the potential-dependent stoichiometry and structure of the 3d-M hydr(oxy)oxides. FIG. 1a summarizes the XAS results for the Co-oxide/Pt(111) system, as a representative of the 3d-M elements considered in this work. Comparisons of reference samples at these potentials are also shown. The comparison reveals that $\delta=0$ at −0.1 V and $\delta=1$ at 1.4V. FIG. 1A illustrates sample XAS spectra for $Co^{2+\delta}O^{\delta}(OH)_{2-\delta}$ on Pt(111) surface for two different potentials E=−0.1 V and E=+1.4 V. FIG. 1b is a STM for Co(OH)$_2$/Pt(111) in the HER region. Polarization curves for the HER for this surface are also shown (50 mVs$^{-1}$). The characteristic height of the clusters shown is ~5.8 Å with a diameter for 15-22 nm. FIG. 1C is a STM for CoOOH/Pt(111) and includes the polarization curves for the OER. The characteristic height of the clusters shown is ~5.6 Å with a diameter for 15-22 nm. Pure Pt(111) polarization curves are shown for comparison in both FIGS. 1b and c. FIG. 1D is a comparison of OH$_{ad}$ charge as a function of oxophillicity of the metal oxide cation (M) for same coverages of the M$^{2+\delta}$O$^{\delta}$(OH)$_{2-\delta}$/Pt(111) surface. Enhanced adsorption of OH$_{ad}$ is observed as the larger area under the anodic peak at 0.6 V as well as the early onset of the OH$_{ad}$ butterfly region.

Results obtained from the XAS analyses for the other 3d-M hydr(oxy)oxides are summarized in Table 1. With respect to Table 1, Mn$^+$ is the valence state of the 3d element; N is the first shell co-ordination number; M-O (Å) is the characteristic bond distance between the 3d metal centre and the oxygen anion. Depending on the nature of the 3d metal, different step changes in oxidation states are observed in different potential regions. The rate of change of oxidation states with potential are found to be dependent on the nature of the elements. In the HER, with the exception of Fe, all elements are in the +2 state. On the other hand, in the OER region, with the exception of Ni, all elements are in an oxidation state>+3. Fe, with its complex redox chemistry at these potentials, is known to exist in multiple forms, such as Fe(II) and Fe(III) oxides and hydroxides, and therefore exhibits a valence state between 2.5 and 3.0. Nickel, exhibiting lower oxidation state at this potential, is not surprising, because for the Ni-modified surfaces we found that, at 1.4V, the phase of Ni(OH)$_2$ present on the Pt(111) surface resembles that of β-Ni(OH)$_2$ and this phase of nickel hydroxide is known to remain stable up to high potentials (<1.5 V; ref. 48) before undergoing complete transformation to NiOOH. The trend of oxidation state in the OER region presented here agrees well with the established oxophilicity trends namely: Ni<Co<Fe<Mn.

With the exception of Fe (ref. 27), the nature/stoichiometry of the 3d-M hydr(oxy)oxides at –0.1 V is found to be in the form of M(u) hydroxides. In contrast, at 1.4 V, the nature/stoichiometry for these 3d-M hydr(oxy)oxides is found to be more diverse, where Co and Fe are present in the M(iii) oxyhydroxide form, with Mn showing a higher valence state (~3.5) with an unclear stoichiometry and Ni exhibiting the lowest valence state of ~2.3. X-ray absorption spectroscopy results clearly indicate that the surface chemistry of the 3d oxides studied in this work is complex. A general notation is used for simplicity, given by: M$^{2+\delta}$O$^{\delta}$(OH)$_{2-\delta}$ (0<δ<1.5), where δ=0 refers to the M(OH)$_2$ state (for example Ni, Co and Mn in the HER region) and δ=1 denotes the MOOH state (for example Co, Fe in the OER region).

The morphology of the 3d-M hydr(oxy)oxide/Pt(111) surfaces was studied using scanning tunneling microscopy (STM). Again, the STM data for the Co(OH)2 and CoOOH clusters on Pt(111) are presented as a typical case (FIG. 1b,c) similar observations were made for Fe and Ni species. The STM image in FIG. 1b clearly shows that Co(OH)$_2$ particles are present as clusters (with an approximate surface coverage of ~40% for the image shown) which are randomly distributed across the (111) terraces. The Co(OH)$_2$ clusters have spheroid-like shapes, with characteristic diameters of ~7-10 nm and heights of ~0.49-0.65 nm; the latter dimension corresponds to approximately two layers of electrically conductive Co(OH)$_2$. The distribution of the clusters over the entire surface indicates that the clusters grow in a three dimensional (3D) (Volmer-Weber) fashion, seldom achieving a complete monolayer coverage. Importantly, after recording 50 cyclic voltammograms (CVs) between ~0.3V±0.4 V, the STM images of all 3d-M hydr(oxy)oxide/Pt(111) systems remain the same, indicating that in this potential range the morphology of the surface is stable. In contrast, for an electrode held at 1.55 V the STM image in FIG. 1c indicates significant sintering of the CoOOH nanoparticles; a distribution of sizes ranging from ~15 to 25 nm, with approximately constant

TABLE 1

XAS Analysis for M$^{2+\delta}$O$^{\delta}$(OH)$_{2-\delta}$ systems.

| | Element | | | | | |
|---|---|---|---|---|---|---|
| | HER Potential Region (E < 0.0 V) | | | OER Potential Region (E ~ 1.4 V) | | |
| Element | M$^{n+}$ | N | M-O(Å) | M$^{n+}$ | N | M-O(Å) |
| MN | 2.0 ± 0.1 | 1.6 ± 0.3 | 2.10 ± 0.04 | 3.5 ± 0.1 | 3.3 ± 0.4 | 1.89 ± 0.03 |
| Fe | 2.7 ± 0.1 | 2.5 ± 0.5 | 1.93 ± 0.03 | 3.0 ± 0.1 | 3.4 ± 0.3 | 1.95 ± 0.02 |
| Co | 2.2 ± 0.1 | 1.8 ± 0.4 | 2.02 ± 0.05 | 2.9 ± 0.2 | 3.9 ± 0.5 | 1.89 ± 0.02 |
| Ni | 2.1 0.1 | 2.5 ± 0.4 | 2.06 ± 0.3 | 2.3 ± 0.1 | 3.2 ± 0.6 | 2.02 ± 0.03 |

Examination of X-ray absorption near edge structure (XANES) results reveals that, at ~0.1 V, the Co(OH)$_2$ elements remain mostly in the valence state+2 (Co$^{2+}$), in the form of Co(OH)$_2$, whereas at 1.4 V the valence state is close to +3 (Co$^{3+}$), resembling CoOOH. Also included in Table 1 are the M-O distances and coordination numbers of the corresponding 3d-M hydr(oxy)oxides, which, as expected, are dependent on both the nature of the 3d elements as well as the applied electrode potential. Overall examination of the XAS results, summarized in Table 1, reveals several significant features. All 3d elements are found to be in valence states different from M(0), indicative of the absence of metal deposition on the Pt(111) substrates; the oxidation state of the 3d-M elements is found to be dependent on potential, with the rate of this change being slowest for Ni and fastest for Mn.

heights of two layers. This morphology was found to be stable in the OER region (potential and time-independent). Given that similar morphological changes were exhibited by the other M$^{2+\delta}$O$^{\delta}$(OH)$_{2-\delta}$/Pt(111) systems, it is believed that these well-defined surface structures form the basis for any predictive ability in tailoring catalysts to have desirable reactivity for the HER and the OER in alkaline environments.

Figure 2:
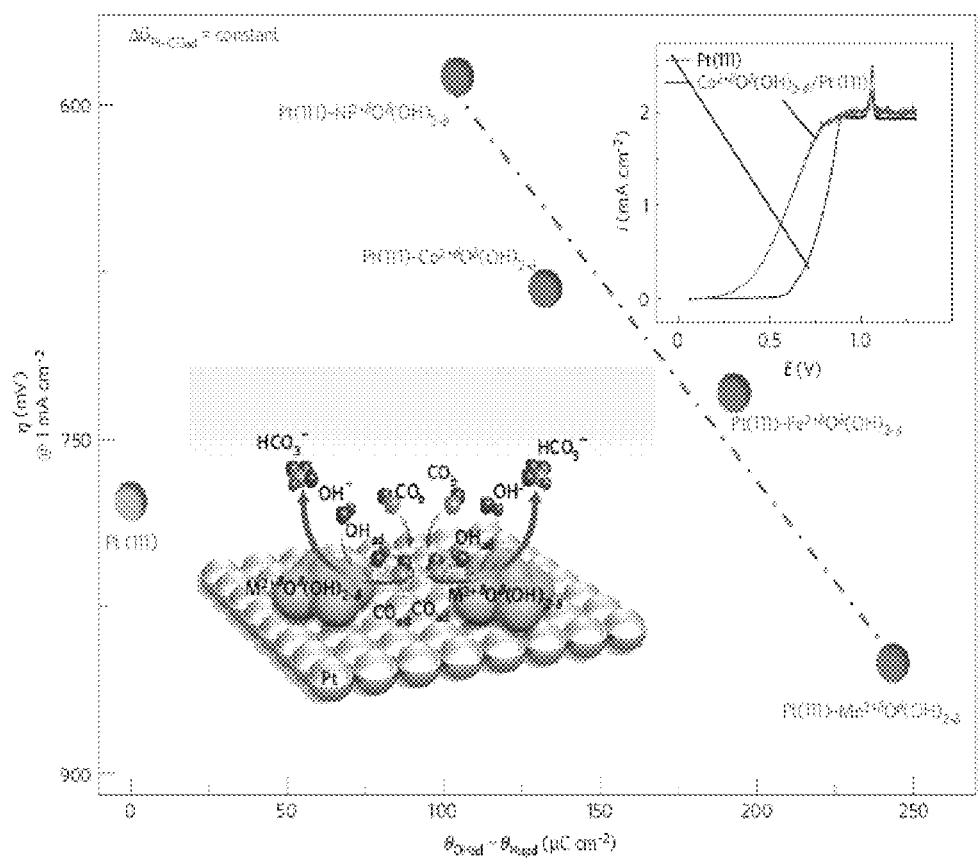
FIG. 2 is a chart of the elements arranged in the order of their oxophillicity from Mn to Ni as estimated for the well-defined system shown in FIG. 1A.

Electrochemical characterization was carried out by comparing the CVs of the Pt(111) and Co(OH)$_2$/Pt(111) surfaces (inset in FIG. 1b). As was the case for the XAS and STM analyses, the CV behavior of Co(OH)$_2$ is a fair representation of the other 3d-M hydr(oxy)oxide systems (shown in inset of FIG. 1d). Consistent with earlier reports for Pt(111), cyclic voltammetry of Pt(111) (FIG. 1b) shows that the adsorption of underpotentially deposited hydrogen (defined as the state of hydrogen adsorbed at a potential that is positive of the Nernst potential for the hydrogen reaction, $H_{upd}$) between 0.05 and 0.35 V is followed first by a wide double-layer potential region and then by the formation of an $OH_{ad}$ adlayer (usually termed as the 'butterfly' region) between 0.6 and 0.95 V. FIG. 2 (bottom inset) shows that the surface coverage of the $H_{upd}$ ($\Theta_{Hupd}$) is reduced by ~45% on a $Co(OH)_2/Pt$ (111) electrode. Other 3d-M hydr(oxy)oxide covered surfaces behave in a similar manner (inset FIG. 1*d*), suggesting they act as a third body, selectively blocking the adsorption of $H_{upd}$ without affecting the $Pt$—$H_{upd}$ energetics. Thus, determination of the $\Theta_{Hupd}$ from CVs of modified Pt(111) surfaces enables accurate determination of surface coverage by the 3d-M hydr(oxy)oxide clusters. In the following, Pt(111) is always modified with nearly identical (~45%) amounts of these clusters (FIG. 1*d*), thereby enabling the use of a well-characterized $M^{2+\delta}O^{\delta}(OH)_{2-\delta}/Pt(111)$ electrode ($0 \leq \delta \leq 1.5$).

In contrast to the Pt—$H_{upd}$ bonding, FIG. 1*b* shows that the effects of a $Co^{2+\delta}O^{\delta}(OH)_{2-\delta}/Pt(111)$-modified Pt(111) surface on adsorption of OH— are significant. Three distinct features are noteworthy: (1) the increase in the charge under the $OH_{ad}$ ($\Theta_{OHad}$) region between $0.6 V<E<0.95 V$, (2) negative shifts for both the onset of the $OH^-$ adsorption and its desorption, and (3) $OH_{ad}$ adsorption/desorption features are strongly irreversible. The magnitude of the changes in the $OH_{ad}$ charge is greater than what can occur on an unmodified Pt(111) surface; so it is believed that the oxide clusters' interaction with the OH provides an important contribution to the observed value of $\Theta_{OHad}$. Similar behavior is exhibited by the other 3d elements considered here (FIG. 1*d*); however, the charge corresponding to the formation of $OH_{ad}$ is strongly dependent on the nature of the 3d element and they follow the order Ni<Co<Fe<Mn. This result clearly demonstrates that the oxophilicity of the 3d elements is strongly dependent on their 'nobility' (position in the periodic table). This, in turn, follows the oxophilicity of the 3d-M hydr(oxy)oxides, a conclusion that is supported by density functional theory (DFT) calculations, specifically for Co and Mn oxide clusters. The DFT analyses show stronger adsorption of OH on model two $Co(OH)_2/Pt(111)$ films (treated as a film with two layers of $Co(OH)_2$ on the Pt(111) surface) than for clean Pt(111). Furthermore, the variation in binding energy moving from Co-based to Mn-based systems is consistent with the observed oxophilicity derived from the $\Theta_{OHad}$ values.

The electrodes showing a linear variation in the $\Theta_{OHad}$ with the nature of the 3d-M elements (FIG. 1*d*). The trend in the values of $\Theta_{OHad}$ as a function of the 3d-M cation indicates that this quantity correlates well with the $OH_{ad}$-$M^{2+\delta}$ bonding. Although the physical processes that are associated with the formation of $OH_{ad}$ on metal and metal oxide surfaces are not well defined, there is some consensus that in alkaline solution the pseudocapacitance observed in the CVs of Pt(111) in the range $0.6<E<0.95$ is just reversible $OH^-$ adsorption on the (111) terrace sites. $OH_{ad}$ species that are present at potentials below 0.6 V, are found exclusively on the defect sites. The relatively small number of such defects on Pt(111) makes them invisible in the CV owing to the larger pseudocapacitive contributions from the $H_{upd}$. To overcome this limitation of the CV method, it is customary to 'probe' the $OH_{ad}$ with electrochemical reactions for which the $OH_{ad}$ is a reactant. The CO oxidation reaction was used to verify/validate the oxophilicity trends observed in the butterfly region at potentials below 0.6 V.

The reaction mechanism for CO oxidation reaction has been well established as following the Langmuir-Hinshelwood (L-H) pathway for Pt bimetallic systems such as PtSn and PtMo (refs 30,37). These catalysts are bi-functional in nature, where the CO adsorbs exclusively on the Pt sites and the $OH_{ad}$ groups are present exclusively on the more oxophilic Sn/Mo sites that facilitate the oxidative removal of CO. In line with these systems, for the case of Pt(111) modified by $M^{2+\delta}O^{\delta}(OH)_{2-\delta}$ clusters, it believed that whereas CO is adsorbed exclusively on the Pt sites ($CO_{bulk} \leftrightarrow Pt$—$CO_{ad}$), the $OH_{ad}$ species adsorb preferentially on 3d-M hydr(oxy) oxides ($OH^- + M^{2+\delta}O^{\delta}(OH)_{2-\delta} \leftrightarrow OH_{ad}$-$M^{2+\delta}O^{\delta}(OH)_{2-\delta} + e^-$). The presence of $OH_{ad}$ can then be tested simply by monitoring the rate of CO oxidation at the constant electrode potential through a L-H type reaction ($Pt$—$COad + OH_{ad}$-$M^{2+\delta}O^{\delta}(OH)_{2-\delta} + 2OH^- \leftrightarrow HCO_3^- + e^- + H_2O$). FIG. 2 illustrates polarization curves for CO oxidation on $Co^{2+\delta}O^{\delta}(OH)_{2-\delta}/Pt(111)$ and bare Pt(111) as typical examples; the corresponding activities for other 3d-element-modified electrodes are summarized in FIG. 2.

FIG. 2 is a chart of the elements are arranged in the order of their oxophillicity from Mn to Ni. Pt is shown in the figure as a reference. Top inset: a comparison of the polarization curves for Pt(111) and Pt(111) with 40% Cohydr(oxy)oxides for the CO oxidation reaction. As can clearly be seen, the onset potentials for CO oxidation are shifted ~300 mV negative from those of the bare Pt(111) surface. Bottom inset: a schematic showing the L-H mechanism for the CO oxidation reaction. CO from bulk is found to adsorb on the free Pt site near the oxide clusters. $OH_{ad}$ is formed by either adsorption of $OH^-$ from the electrolyte and/or a change in oxidation state of the cluster cation $M^{2+\delta}$. In the presence of $CO_{ad}$ and $OH_{ad}$ in each others vicinity, reaction between $CO_{ad}$ and $OH_{ad}$ species the occurs forming an intermediate which is eventually converted to (bi)-carbonates. The free energy for $Pt$—$CO_{ad}$ is fixed, which enables the treatment of these bi-functional metal-oxide/metal catalysts as a 'pseudo' mono-functional catalyst with a singular descriptor $OH_{ad}$-$M^{2+\delta}$.

Clearly, the CO oxidation current on $Co^{2+\delta}O^{\delta}(OH)_{2-\delta}/Pt(111)$ is shifted negatively by about 0.3 V with respect to the bare Pt(111) surface, indicating that this surface behaves as a bi-functional catalyst. As depicted schematically in FIG. 2 (bottom inset), the reaction proceeds along the perimeters of $CO_{ad}$ islands and neighboring $M^{2+\delta}$ sites. The fact that the onset potential for the CO oxidation reaction on Co-modified Pt(111) is observed at 0.1 V, strongly suggests that oxygenated species must be present on the $Co^{2+\delta}O^{\delta}(OH)_{2-\delta}$ defect sites at these potentials. Although the same conclusion commonly holds true for all other $M^{2+\delta}O^{\delta}(OH)_{2-\delta}/Pt(111)$ systems, the reactivity of these surfaces for the CO oxidation reaction is found to be dependent on the nature of the 3d element.

In general, the kinetics of the CO oxidation reaction on these surfaces is expected to be a function of both the $Pt$—$CO_{ad}$ and $OH_{ad}$-$M^{2+\delta}$ energetics. If the $Pt$—$CO_{ad}$ interaction is treated as independent of the nature of the 3d-M hydr(oxy)oxide, then the rate of the CO oxidation reaction should depend only on the $OH_{ad}$-$M^{2+\delta}$ energetics. Thus, by fixing the $Pt$—$CO_{ad}$ energetics, it is possible to treat the reaction as a 'pseudo' mono-functional reaction that is controlled by the descriptor related to $OH_{ad}$-$M^{2+\delta}$ bond strength. Indeed, FIG. 2 reveals that the rate of the CO oxidation reaction is inversely proportional to the $OH_{ad}$-$M^{2+\delta}$ bond strength, that is, the activity increases in the order: Mn<Fe<Co<Ni. It is believed that, for a strong interaction, such as that $OH_{ad}$-$M^{2+\delta}$, the CO oxidation reaction is inhibited because of the relatively low reactivity of $OH_{ad}$. In fact, the $OH_{ad}$-$M^{2+\delta}$ bond is so strong that even pure Pt is more active than the $M^{2+\delta}O^{\delta}(OH)_{2-\delta}/Pt(111)$. In contrast, for Ni hydr(oxy)oxides that bind OHad neither too strongly nor too weakly, we observe the maximum activity for the CO bulk oxidation. The similarity in the trends observed for the activity for the CO oxidation reaction and the $OH_{ad}$-$M^{2+\delta}$ interaction strength in the butterfly region, confirms that the same guiding principle, namely the oxophilicity of the 3d-M cation, is valid in the Hupd region as well. This indicates that the oxophilicity trends derived in FIGS. 1d and 2 are valid between 0.05 and 0.95 V.

Figure 3:
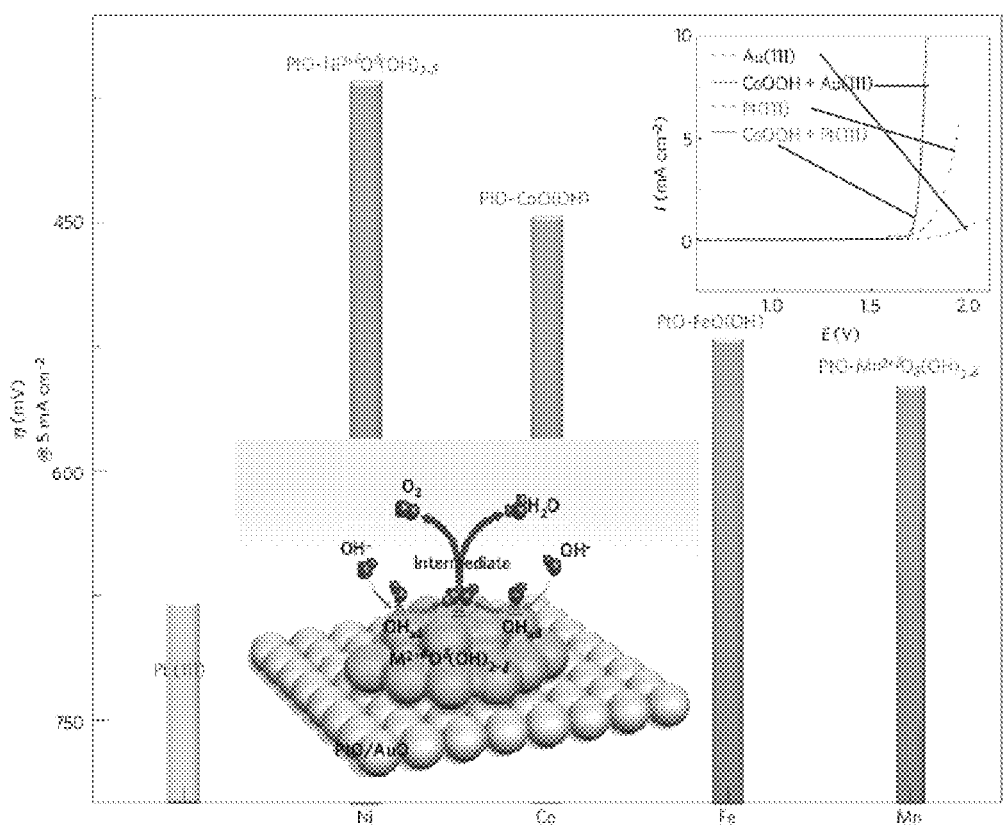
FIG. 3 is a chart illustrating the trend in overpotential for the oxygen evolution reaction (OER) is shown as a function of the 3d transition elements.

As a starting point, the kinetic rates of the OER on the Pt(111)-oxide electrode (dubbed hereafter as PtO) and the CoOOH/PtO electrode (shown as inset in FIG. 1c). As were compared before, the Co system is representative of the other $M^{2+\delta}O^{\delta}(OH)_{2-\delta}$ systems. FIG. 1c shows that the onset of the OER on the CoOOH/PtO electrode is shifted by ~0.25 V, to more negative potentials, compared with PtO. These differences may reflect variations in the energetics (activation energies and/or the enthalpies of adsorption) for the formation of active intermediates at these two surfaces, the exact values of which are unknown. Nevertheless, the low activity of PtO, consistent with earlier reports, is indicative of the weaker $OH_{ad}$—PtO interaction, and thus it seems that the rate-determining step for such noble metal catalysts could be the formation of OHad-PtO intermediates (OH$^-$+PtO $\leftrightarrow$ $OH_{ad}$—PtO+e$^-$). Along the same lines, the significant activity enhancement of the OER on the CoOOH/PtO electrode could be due to the enhanced interaction of OH— with CoOOH. To verify this, we have also compared the OER on the CoOOH/AuO electrode. The fact that the rate of reaction on both these surfaces is the same (top inset of FIG. 3) is confirmation that the OER reaction rate is controlled only by interaction of reactants and reaction intermediates with CoOOH and not the metal substrate. Given that the same is also true for the other $M^{2+\delta}O^{\delta}(OH)_{2-\delta}$/Pt(111) electrodes, these catalysts are purely mono-functional, a fact which is further confirmed by the monotonic variation in OER activities as a function of 'loading' of the CoOOH clusters. As summarized in FIG. 3, the OER on $M^{2+\delta}O^{\delta}(OH)_{2-\delta}$/PtO exhibits activities increasing from Mn to Ni hydr(oxy)oxides. FIG. 3 is a chart illustrating the trend in overpotential for the oxygen evolution reaction (OER) is shown as a function of the 3d transition elements. The elements are arranged in the order of their oxophilicity from Mn to Ni. Pt is shown in the figure as a reference. Top inset: a comparison of polarization curves for Pt(111) and Au(111) with 40% CoOOH for the OER. As can clearly be seen, the two potential curves are identical, suggesting a limited or no role played by the noble metal substrate for this reaction. As a result, this reaction is classified as a mono-functional reaction, and the main descriptor (as can be clearly seen from the trend) is still the $OH_{ad}$-$M^{3+}$ interaction. Bottom inset: a schematic showing the OER. OH$^-$ from the bulk is found to adsorb on the free catalyst site on the oxide clusters. The adsorbed OH groups $OH_{ad}$ react with other such groups to form a reaction intermediate (re-combination), which is then further oxidized to $O_2$ and $H_2O$.

This suggests that the overall reaction rates are driven by the strength of the interaction between the two oxidic species, the recombination step being the rate determining (2$OH_{ad}$-$M^{2+\delta}O^{\delta}(OH)_{2-\delta}$→products), rather than by the initial adsorption step (OH$^-$+$M^{2+\delta}O^{\delta}(OH)_{2-\delta}$$OH_{ad}$-$M^{2+\delta}O^{\delta}(OH)_{2-\delta}$+e$^-$), which, as shown in FIG. 1d, exhibits the opposite trend compared with that in FIG. 3. More than one recombined species might be formed during OER chemistry on oxides, but those mechanistic details do not affect our interpretations of the OER trends. In particular, too strong an interaction between 3d-M hydr(oxy)oxides and $OH_{ad}$ can lead to an adverse effect, wherein the reaction intermediates are stabilized, leading to a lower turnover frequency (defined as the number of complete reaction events per site per second). This leads to poisoning of the surface and a concomitant decrease in OER activities, as shown schematically in FIG. 3 (bottom inset). Thus, for the 3d elements considered here, Ni, with its optimal interaction strength with $OH_{ad}$, satisfies the Sabatier principle for catalyst design. Considering that the reactivity trends observed for the OER (Ni>Co>Fe>Mn) match that observed for the CO reactivity, we can conclude that the $OH_{ad}$-$M^{2+\delta}$ interaction (oxophilicity) trends can be extended up to the OER potential regions. The trends in the energetics between $OH_{ad}$-$M^{2+\delta}$ for OH$^-$, produced as the water dissociation product, which are relevant in the hydrogen evolution potential region, are similar to that for the $OH_{ad}$ formed from the supporting electrolyte between 0.05 and 2.0 V.

Figure 5B:
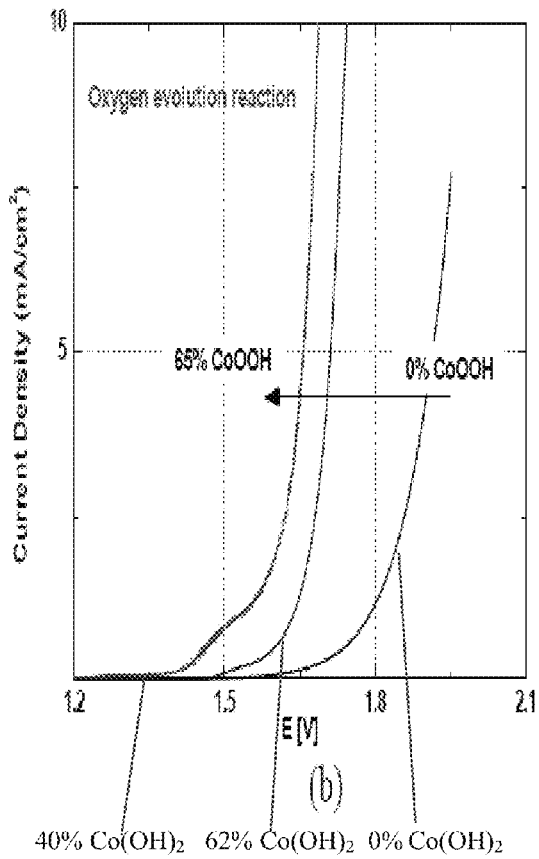
FIG. 5B illustrates a graph of OER activity as a function of three different coverages of CoOOH: 0% (bare Pt(111) surface), 34% and 65% coverage on the Pt(111) surface.

In a bi-functional effect, the edges of Ni(OH)$_2$ clusters promote the dissociation of water ($H_2O \leftrightarrow$ H+ OH$^-$+e$^-$). The dissociation step is then followed by H adsorption on the nearby Pt surfaces (H $\leftrightarrow$ Pt—$H_{ad}$) and by adsorption of OH$^-$ on Ni(OH)$_2$ (see bottom inset in FIG. 7). The kinetics of the HER will depend both on the rate of $H_{ad}$ recombination, which is optimized on the Pt substrate[43], and on the rate of desorption of $OH_{ad}$ to accommodate the adsorption of $H_2O$ on Ni(OH)$_2$ clusters. The presence of a bi-functional mode of catalysis for the HER is also confirmed by the observed enhancement for the HER activities on Co(OH)$_2$/Pt(111) systems (See FIG. 5). Further confirmation of the bi-functional mechanism was achieved by observing a distinct maximum in the activity versus coverage of Co(OH)$_2$ as well as by comparing the Co(OH)$_2$/Au(111) systems with their Pt(111) counterparts. Thus, the overall rate of the HER may, in principle, be controlled by optimizing the density and the nature of the sites required for dissociation of water on $M^{2+\delta}O^{\delta}(OH)_{2-\delta}$, as well as OH$^-$$M^{2+\delta}O^{\delta}(OH)_{2-\delta}$ and metal-$H_{ad}$ energetics.

Figure 4:
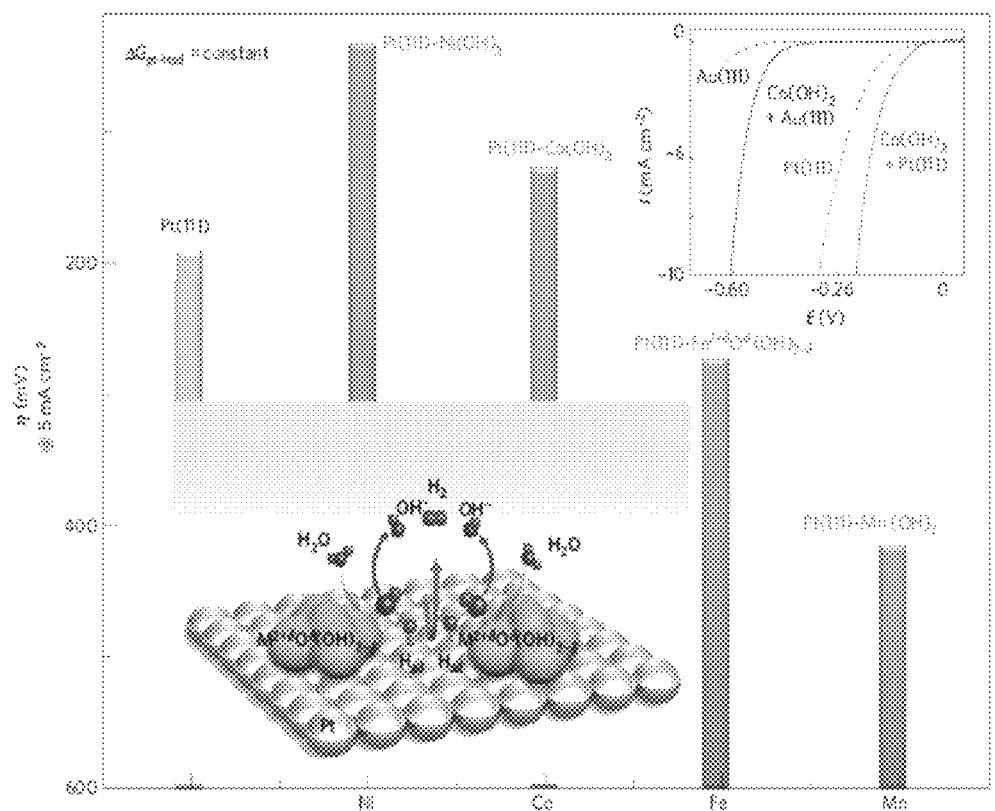
FIG. 4 illustrates the trend in overpotential for the HER for the metal-metal oxide system, where the elements are arranged in order of their oxophillicity from Mn to Ni. Pt is shown in the figure as a reference.

Here, using $M^{2+\delta}O^{\delta}(OH)_{2-\delta}$/Pt(111) surfaces, the descriptor related to the adsorption energetics of Pt—$H_{ad}$ is fixed, which the HER to be treated as a 'pseudo' mono-functional reaction: controlled by the descriptor related to $OH_{ad}$-$M^{2+\delta}$ bond strength. FIG. 4 illustrates The elements are arranged in order of their oxophillicity from Mn to Ni. Pt is shown in the figure as a reference. In the top inset: a comparison of polarization curves for Pt(111) and Au(111) with 40% Co(OH)$_2$ for the HER. As can clearly be seen, the Au(111)/oxide surface is significantly less active than the Pt(111) counterpart. This essentially establishes the role played by the Pt—$H_{upd}$ descriptor. On fixing this interaction, by using Pt(111) as the main substrate, we have focused on the 'pseudo' mono-functional reaction with the OH*$_{ad}$ intermediate on the oxide cluster, along with forming $H_{ad}$ intermediate formed on the Pt substrate. The $H_{ad}$ groups recombine to form H2. Depending on the $OH_{ad}$-$M^{2+\delta}$ strength, the OH*$_{ad}$ is either stabilized (for Mn$^{2+}$, Fe$^{2+\delta}$) or destabilized (Ni$^{2+}$, Co$^{2+}$) on the oxide clusters, which is found to dictate the turnover frequencies for these catalysts.

As summarized in FIG. 4, a monotonic relationship exists between the HER activity and the $OH_{ad}$-$M^{2+\delta}$ with the most active catalysts being Ni(OH)$_2$/Pt(111) and the least active Mn(OH)$_2$/Pt(111). On the basis of the observed catalytic trends, it is clear that a balance must be found between the transition state energies for water dissociation and the final state energies of adsorbed $OH_{ad}$-$M^{2+\delta}O^{\delta}(OH)_{2-\delta}$. According to the standard Brønsted-Evans-Polanyitype principles[46], this results in lower activation barriers for water dissociation, while also resulting in poisoning of the sites required for re-adsorption of water molecules. The net result is that the turnover frequency substantially decreases (below bare Pt activity) for the Fe and Mn hydr(oxy)oxides on which $OH_{ad}$ is more strongly adsorbed. In essence, this suggests that the Fe and Mn behave purely as spectators, blocking the Pt active sites for transforming $H_2O$ to $H_2$. The best combination among the 3d elements considered here, is found for the $Ni(OH)_2/Pt(111)$, which has the most favourable balance between facilitating water dissociation and preventing 'poisoning' with $OH_{ad}$ (water dissociation product), together with the optimal Pt—$H_{ad}$ energetics. The activity trends derived for the HER using a series of 3d-M cations with different interaction strength with OHad clearly establishes the presence of OHad in the HER region (E<0 V). Most probably, the active sites for $OH_{ad}$ are the defects, which are known to be very active for water dissociation. We emphasize that the exact nature of $OH_{ad}$ (electrosorption valency and free energy of adsorption) on the $M^{2+\delta}O^{\delta}(OH)_{2-\delta}$ cluster is not known unambiguously. However, the fact that the reactivity trends for the HER (Ni>Co>Fe>Mn), on surfaces with constant Pt—$H_{ad}$ interaction, are identical to the trends in oxophilicity, established from the CO oxidation reaction, $OH^-$ adsorption in the butterfly region and the OER above 1.6 V, strongly validates the use of OHad-$OH_{ad}$-$M^{2+\delta}$ interaction strength as the descriptor controlling the HER on these $M^{2+\delta}O^{\delta}(OH)_{2-\delta}$/Pt(Au) systems.

Example 1

Platinum and Lithium Ion Electrolyte

Conductive ultrathin $Ni(OH)_2$ clusters (height 0.7 nm, width 8 to 10 nm) were grown on both pristine Pt single-crystal surfaces and Pt surfaces modified by two-dimensional (2D) Pt ad-islands [Pt-islands/Pt(111)]. Relative to the corresponding Pt single-crystal surfaces, the most active $Ni(OH)_2$/Pt islands/Pt(111) electrodes in KOH solutions are more active for the HER by a factor of ~8 at an overpotential of –0.1 V. The HER is further improved by the introduction of solvated $Li^+$ ions into the compact portion of the double layer, resulting in a factor of 10 total increase in activity.

Platinum

The atomic structures of Pt(111) and Pt(111) modified by electrochemically deposited Pt islands, referred as Pt-islands/Pt(111) have previously been studied and characterized. Pt-islands/Pt(111) have previously been observed to impact cyclic voltammetry (CV) traces. Consistent with the higher oxophilicity of low-coordinated Pt sites, the onset of OH adsorption starts at more negative potentials on the Pt island-covered electrode than on pristine Pt(111), whereas the $OH_{ad}$ peaks are less reversible on the former surface.

Figure 6A:
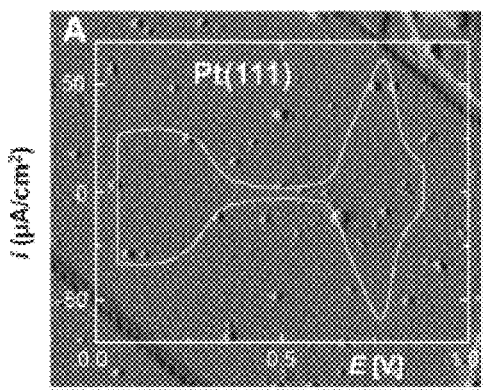
FIGS. 6A-6C are STM images (60 nm by 60 nm) and CV traces for (A) Pt(111), (B) Pt(111) with 2D Pt islands, and (C) Pt(111) modified with 3D $Ni(OH)_2$ clusters in 0.1 M KOH electrolyte.
Figure 6B:
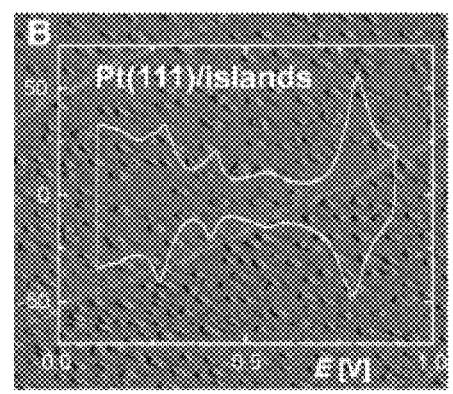
Figure 6C:
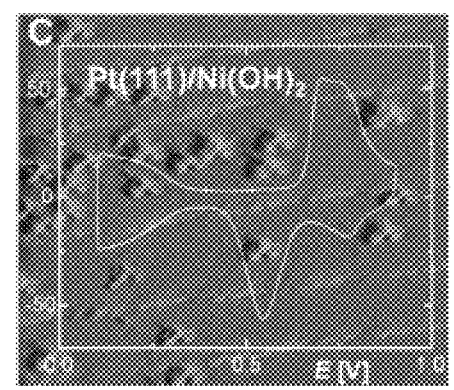
Figure 6D:
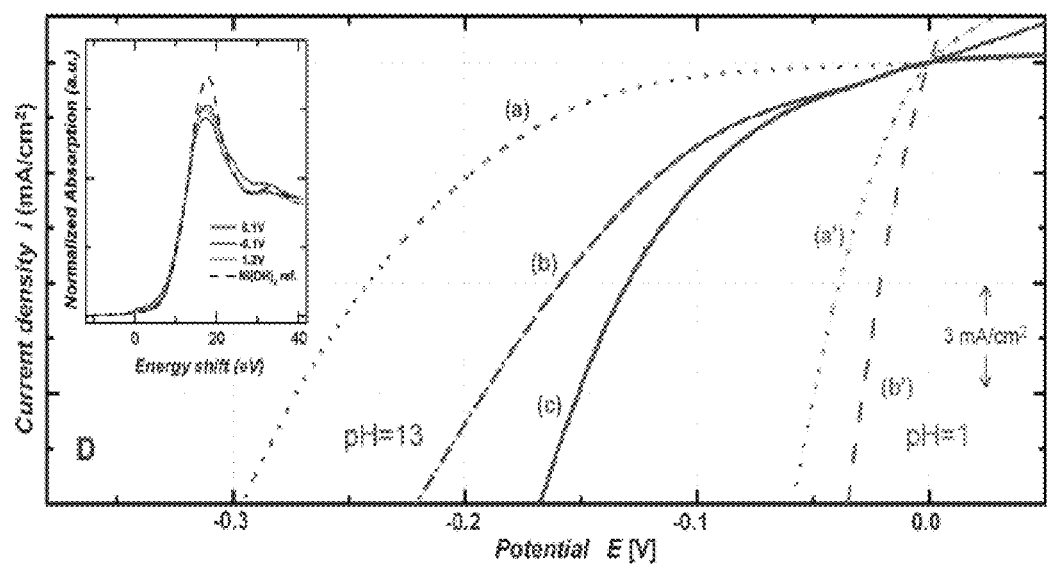
FIG. 6D is a graph of HER activities for Pt(111), Pt-islands/Pt(111), and $Ni(OH)_2$/Pt(111) electrodes in acid solutions (a' and b') are shown to emphasize large initial differences between kinetics of the HER in alkaline versus acid solutions.

FIG. 6D shows that in alkaline solution the Pt-islands/Pt (111) surface is ~5 to 6 times more active for the HER than the corresponding pristine Pt(111) surface. The inset shows XANES spectra for $Ni(OH)_2$ on Pt(111) shown for three different potentials: HER (–0.1 V), $H_{upd}$ (0.1 V), and near OER (1.2 V). Also shown is the reference for $Ni(OH)_2$. No shift in the edge energy in XANES spectra between HER and $H_{upd}$ regions is observed. FIG. 6D also shows that, in acid solution, the HER on the Pt-islands/Pt(111) electrode is improved by only a factor of ~1.5. In turn, this strong pH effect indicates that the low-coordinated Pt atoms may have a significant effect on the rate determining step (rds) of the HER in alkaline solutions. Because the major difference between the reaction pathways in alkaline and acid solutions is that in alkaline solutions, the hydrogen is discharged from water instead of from hydronium ions ($H_3O+$) (12-14), it is believed that the large promoting effect of low-coordinated Pt atoms in alkaline solution is due to more facile dissociative adsorption of water. In turn, this would be consistent with the Volmer reaction being the rds for the HER in alkaline electrolytes. The role of edge-step sites in accelerating dissociative adsorption of water on metal surfaces is well documented in ultra-high vacuum (UHV) environments (28). For materials with near-optimal M-Had energetics (such as Pt), surface reactivity for the HER can be further improved by tailoring the active sites for more efficient dissociative adsorption of water molecules.

Pt(111) and Pt-island/Pt(111) surfaces were modified by depositing 3d-transition metal oxides even more active for water dissociation than Pt defect sites. The 3-d transition metal oxide was deposited as Ni-(hydr)oxide clusters. The local symmetry; the oxidation state of Ni atoms; and the number and identities of and distances between, nearest neighbor atoms were determined by insitu X-ray absorption spectroscopy (XAS) measurements. For example, from the analysis of the X-ray absorption near edge structure (XANES) and extended X-ray absorption fine structure (EX-AFS) of the XAS spectra (as shown in inset of FIG. 6D), Ni—O and Ni—Ni bond distances were found of 2.05±0.0 IÅ and 3.08±0.0 IÅ. It was also determined that Ni remains mostly in the +2 valence state, even after multiple hours of holding the electrode potential at –0.1 V. Furthermore, from the edge shift (defined as the half-height energy of the normalized XANES edge step), between –0.1 V and +0.8 V the change in the oxidation state of Ni is less than 0.5. These results suggest that stable $Ni(OH)_2$ clusters are the predominant hydr(oxide) form on the Pt(111) and Pt-islands/Pt(111) surfaces, especially in the HER potential region. Because the octahedral symmetry of the α and/or β forms of $Ni(OH)_2$ prevents p-d hybridization, the prominent pre-edge from ls->3d transitions implies that the $Ni(OH)_2$ species are rich in defects. It is believed that such defects particularly active for dissociative adsorption of water molecules.

The surface morphologies of Ni(OH)2/Pt(1 11) and Ni(OH)2/Pt-islands/Pt(111) is probed by STM and in situ surface x-ray (SXS) crystal truncation rod measurements. Although atomic resolution could not be obtained, the STM image in FIG. 6C clearly shows that the $Ni(OH)_2$ clusters are randomly distributed across the (111) terraces. All $Ni(OH)_2$ clusters exhibited hemisphere-like shapes, with characteristic diameters of ~8 to 10 nm and heights of ~0.7 nm, the latter corresponding to two layers of $Ni(OH)_2$. This result indicates that the oxide exhibits Volmer-Weber (VW) type growth whereby three dimensional (3D) clusters of $Ni(OH)_2$ grow even at the lowest coverages. VW growth, in turn, is possible if the heat of adsorption of $Ni(OH)_2$ on Pt is lower than the cohesive energy of $Ni(OH)_2$.

The surface coverage of $Ni(OH)_2$ on Pt(111) is estimated from the STM image, by measuring the area covered by the particles on the Pt(111) substrate. Using such analysis, the cluster density was found to reach a maximum at a surface coverage of ~35% for this system. The STM image in FIG. 7A was acquired after deposition of $Ni(OH)_2$ on a Pt(111) surface modified by ~0.2 monolayer (ML) of Pt islands. Clusters of $Ni(OH)_2$ in the STM image appear elliposoidal with particle sizes between 4 and 12 nm. Formation of both 3D $Ni(OH)_2$ clusters (having a predominantly ellipsoidal shape) and oxide free terraces were observed. The clusters had approximately constant heights of ~O.8 nm but diameters ranging from 4 to 12 nm. The same STM image, however, revealed no visible presence of 2D Pt islands, suggesting that $Ni(OH)_2$ preferentially nucleates on the Pt surface defects and that most of Pt islands are covered by $Ni(OH)_2$. In certain implementations, the most preferred form is the optimal size distribution, with small enough Ni(OH)2 clusters that the islands help in nucleating the small hydr(oxy)oxide clusters growth. The nanoparticles, and nanomaterials typically have such defects on the surface of the particles as a result the hydr(oxy)oxide clusters grown on them will have the optimal properties. Thus, in certain embodiments, the only property that needs to be tuned the is the activity of the materials.

Figure 7A:
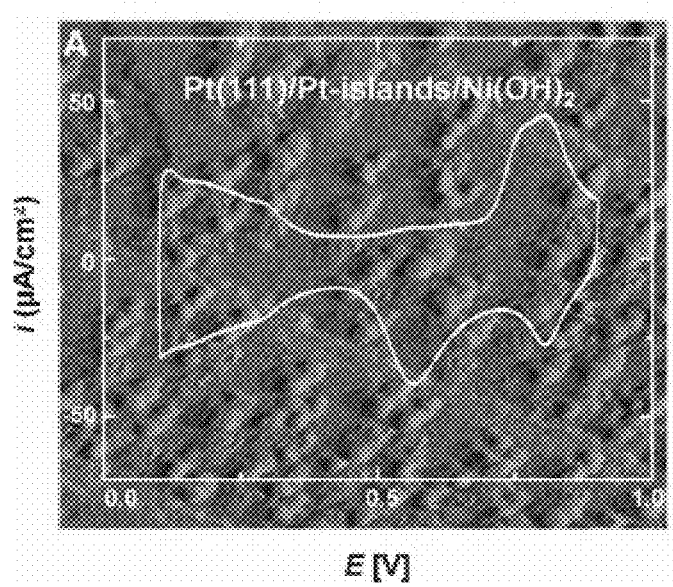
FIG. 7A is an STM image (60 nm by 60 nm) and CV trace of the $Ni(OH)_2$/Pt-islands/Pt(111) surface.

The $Ni(OH)_2$ clusters play an important function in the formation of $H_{upd}$ and $OH_{ad}$ adlayers on Pt(111) and Pt(111)/Pt-islands electrodes. Addition of $Ni(OH)_2$ on the surface of both Pt(111) as well as on the Pt(111) surface covered with Pt-islands, show systematic decrease in the coverage of $H_{upd}$ by ~35%. This suggests that the $Ni(OH)_2$ clusters selectively block the Pt sites corresponding to $H_{upd}$. Furthermore, the two sharp $H_{upd}$ peaks characteristic of hydrogen adsorption/desorption on the Pt(111) electrode modified by the 2D Pt islands, are completely suppressed on the surface covered by the 3D $Ni(OH)_2$ clusters (FIG. 7A). This is additional evidence consistent with the STM results that defects serve as the nucleation centers for electrodeposition of $Ni(OH)_2$. It is believed that Pt islands are predominantly covered by Ni $(OH)_2$. In contrast to the $H_{upd}$ potential region, an enhanced adsorption of $OH_{ad}$, which is accompanied by irreversible reduction of $OH_{ad}$ on the negative-going sweep, is observed on both electrodes, arising from the higher oxophilicity of the surface elements.

Figure 7B:
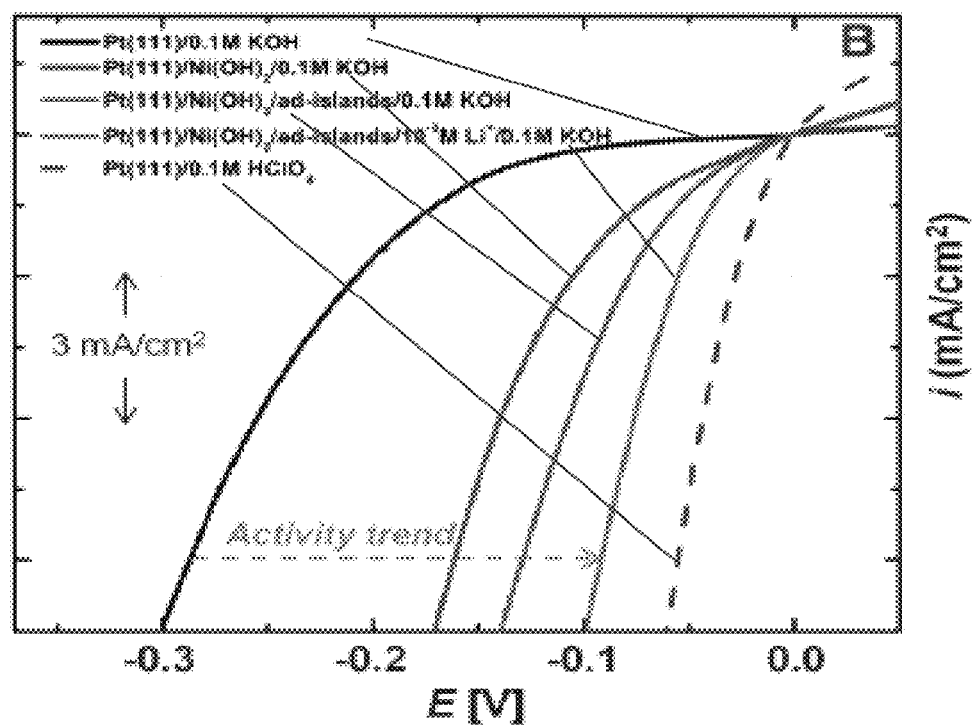
FIG. 7B is a graphical comparison of HER activities with Pt (111) as the substrate. The Pt-islands are used to nucleate the growth of oxides to enhance the size distribution of the oxides.
Figure 8:
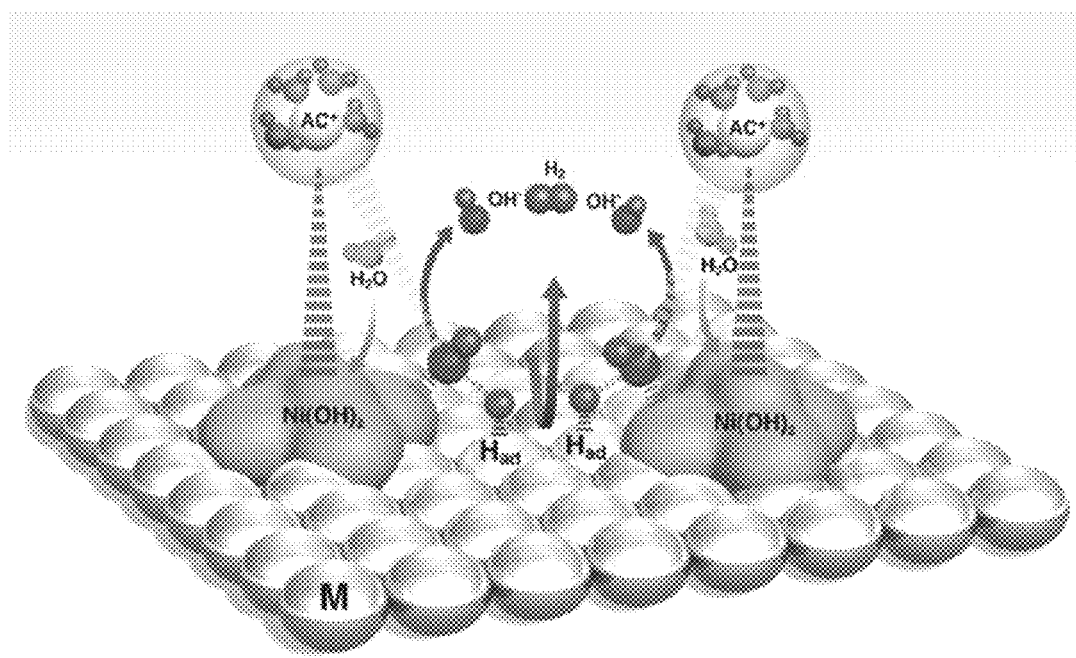
FIG. 8 is a schematic representation of water dissociation, formation of $M-H_{ad}$ intermediates, and subsequent recombination of two $H_{ad}$ atoms to form $H_2$ (magenta arrow) as well as $OH^-$ desorption from the $Ni(OH)_2$ domains (red arrows) followed by adsorption of another water molecule on the same site (blue arrows).

Although in the presence of $Ni(OH)_2$ clusters there are 35% fewer Pt sites available for the HER than on the bare Pt(111) substrate, the $Ni(OH)_2$/Pt(111) electrode is ~7 times more active for the HER than the corresponding bare Pt(111) electrode (FIG. 6D). Moreover, FIG. 7B shows that the activity is further enhanced (~8 times relative to bare Pt(111)) on the $Ni(OH)_2$/Pt-island/Pt(111) surface; at 6 mA/cm2, the difference in overpotential between the HER in alkaline and acid solutions is reduced to only 100 mV. On both surfaces, $Ni(OH)_2$ promotes the dissociation of water and thereby enhances the rate of formation of $H_{ad}$ intermediates on the metal surface. As schematically depicted in FIG. 8, it is believed that water adsorption requires concerted interaction of O atoms with $Ni(OH)_2$ and H atoms with Pt at the boundary between $Ni(OH)_2$ and Pt domains. Water adsorption requires concerted interaction of) atoms with $Ni(OH)_2$ (broken orange spikes) and H atoms with Pt (broken magenta spikes) at the boundary between $Ni(OH)_2$ and Pt domains. The $Ni(OH)_2$-induced stabilization of hydrated cations ($AC^+$) (broke dark blue spikes) likely occurs through noncovalent (van der Waals-type) interactions. Hydrated $AC^+$ can further interact with water molecules (broken yellow spikes), altering the orientation of water as well as the nature and strength of interaction of the oxide with water. Water adsorption is then followed by water dissociation and hydrogen adsorption ($H_{ad}$) on the nearby vacant Pt sites. Finally, two $H_{ad}$ atoms on the Pt surface recombine to form $H_2$ ($H_2$ desorption step) and OH desorbs from the $Ni(OH)_2$ domains followed by adsorption of another water molecule on the same site.

From a surface reactivity standpoint, fruitful kinetic synergy (bi-functionality) between $Ni(OH)_2$ and Pt appears to be the key to maximizing the rate of the HER. In FIGS. 7 A-B, incremental improvements in activities for the HER in 0.1M KOH from the unmodified Pt(111) surface are shown for the hierarchical materials [ad-islands, $Ni(OH)_2$, and their combination] as well as the double layer (addition of $Li^+$ cations). The activity for the unmodified Pt(111) surface in 0.1 M $HClO_4$ is shown for reference. Dashed arrow shows the activity trend. As shown in FIG. 7B, this bi-functionality, in turn, brings the activity of the HER in alkaline solutions very close to the activity of Pt in acid solutions. In order to verify this conclusion, we have also compared the HER on Au(111) and $Ni(OH)_2$/Au(111) in alkaline solution. The relatively weak interaction between Au and $H_{ad}$ offsets the benefit of the enhanced water dissociation at the $Au/Ni(OH)_2$ interface. As a result, the rate of the HER on the $Ni(OH)_2$/Au(111) surface is much lower than on the Pt(111)/$Ni(OH)_2$ surface, though the Au with Ni(OH)2 exhibits a much higher HER activity than pure Au as well. This further emphasizes the importance of choosing the right metal-oxide/metal pairs in optimizing the kinetics of the HER. Generally, metal with Ni(OH)2 will have higher activity than the intrinsic metal. Two types of choices exist for the HER catalyst: high activity, higher cost catalyst, preferably Ir metal with Ni(OH)2 and the cost effective material with a higher loading, preferably Ni metal (and its different forms such as Raney and alloys) with Ni(OH)2 modification. As for the OER: Ni and Co hydr(oxy)oxides are both suitable materials but improved by the described conductive oxide clusters by decorating them on a metal substrate (preferably something stable in the OER region) such as Au.

Lithium Cations with Platinum Catalysts

There have been several recent studies that unambiguously showed that the rate of electrochemical reactions on Pt in alkaline solutions is controlled by the presence of alkali-metal cations ($AC^+$). However, these effects have been entirely restricted to the potential region of a critical OHad coverage (E>0.6V), the latter species serving to stabilize hydrated cations in the compact part of the double layer through non-covalent (Van der Waals type) interactions. This stabilization leads to the formation of $OH_{ad}$-$AC^+$($H_2O$)$_x$ complexes that can either decrease the reactivity of Pt by blocking the active sites for adsorption of reactants such as $O_2$, H2 and $CH_3OH$ or, as in the case of the CO oxidation reaction, improve the reactivity of Pt via enhanced adsorption of $OH_{ad}$.

For these purposes, the effect of hydrated Li cations was probed mainly because, in alkaline environments, $Li^+$ is known to interact with $H_2O$ and $OH_{ad}$ more strongly than $K^+$. $Li^+$ cations have no effect on the HER on Pt(111) surfaces. However, the results in FIG. 7B revealed that the HER on $Ni(OH)_2$/Pt-islands/Pt(111) is enhanced almost by a factor of two in the presence of $Li^+$ cations. This increase in activity has substantially narrowed the gap between the rates of HER on Pt in acid and, using the described $Ni(OH)_2$/Pt-islands/Pt (111), in alkaline solution. FIG. 7B shows that, at 5 mA/cm$^2$, the difference in overpotential between acid and alkaline environments is narrowed to only 35 mV. The fact that the activity of the HER is affected by the nature of alkali metal cations strongly suggests that $Ni(OH)_2$/$Li^+$—OH—H complexes are present in the compact portion of the double layer. The presence of this complex, by itself, does not explain the 2-fold increase in HER activity. It believed that the probability of water dissociation is significantly enhanced via possible $L^+$-induced steric and/or electronic effects on the interfacial water structure and reactivity, as shown schematically in FIG. 8. Thus, $Ni(OH)_2$ plays a dual role: in addition to assisting with water dissociation, it also provides an anchor to hold the beneficial $Li^+$ ions in the compact portion of the double layer.

Example 1B

Pt(110)

Figure 9A:
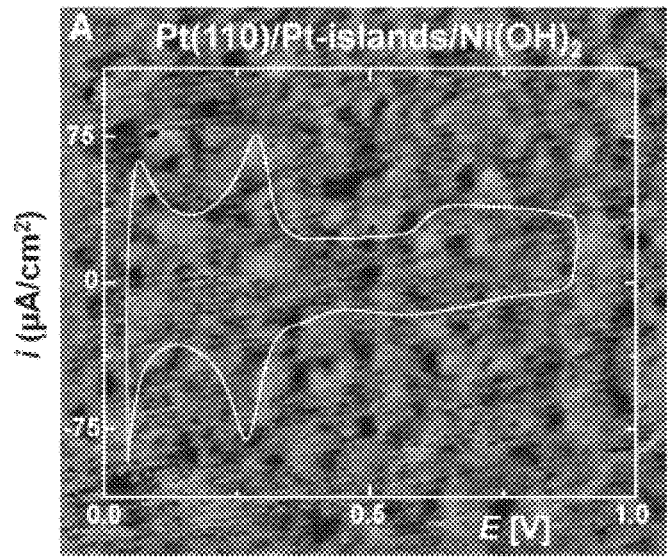
FIG. 9A is a STM image (50 nm by 50 nm) and CV trace for Ni(OH)2/Pt-islands/P(110) single-crystal surface. STM image shows Ni(Oh)$_2$ randomly distributed on inherently rough Pt(110).
Figure 9B:
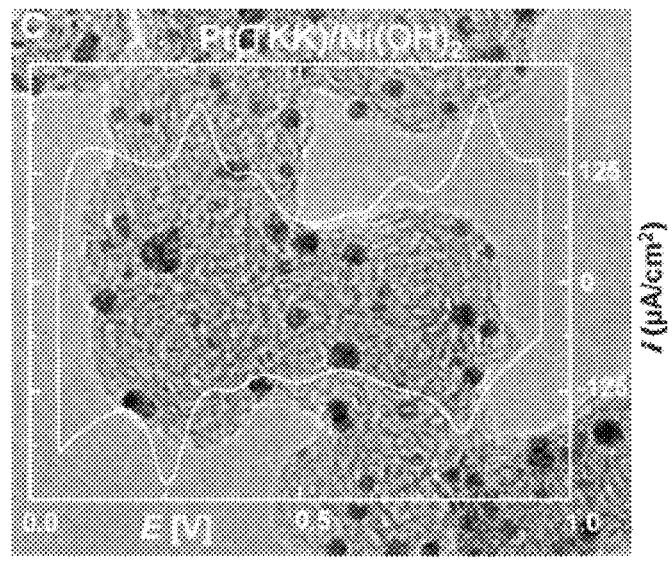
FIG. 9B is a comparison of HER activities with Pt(110) as the substrate.
Figure 9C:
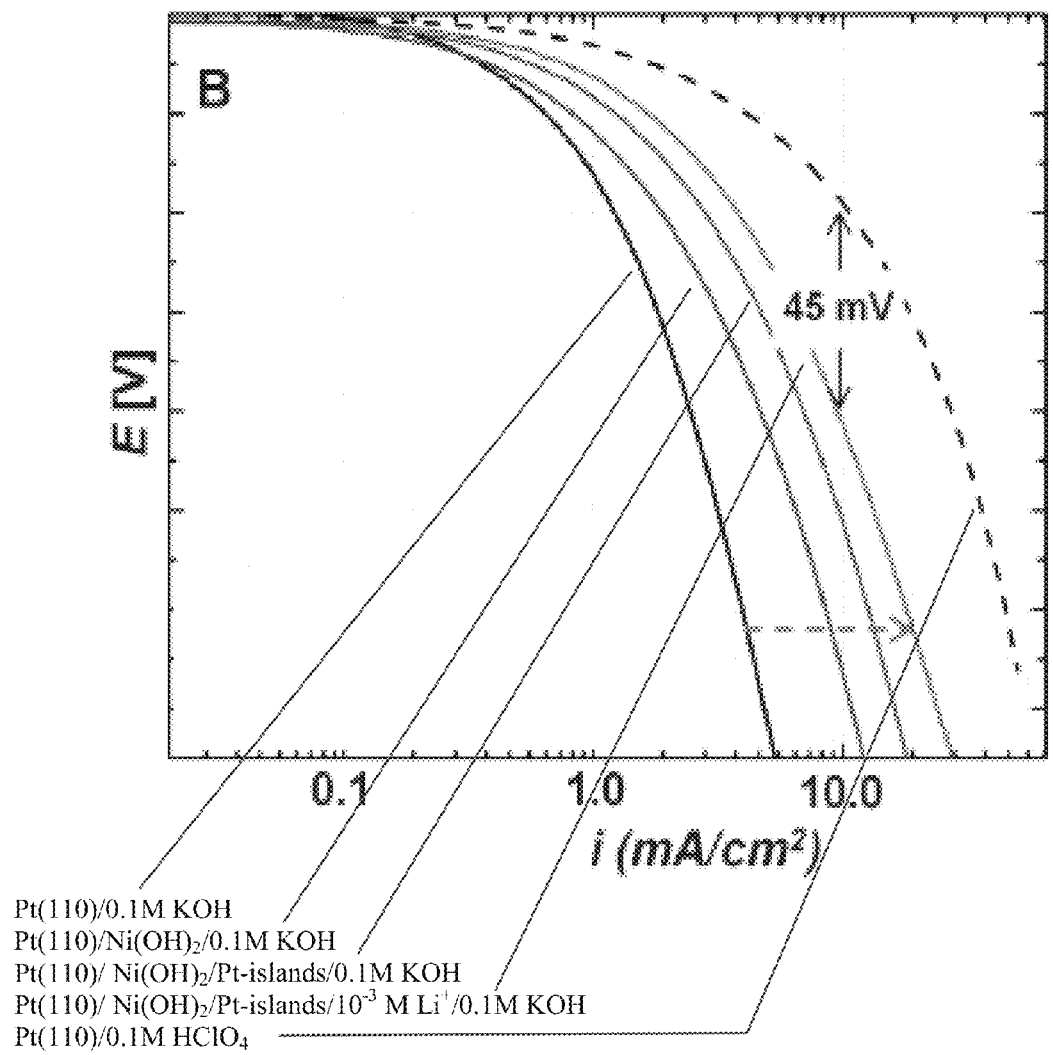
FIG. 9C is a transmission electron micrograph image (50 nm by 50 nm) and corresponding DV trace of $Ni(OH)_2$-free Pt-nano catalysts (TKK) with an average particle size of 5 nm.
Figure 9D:
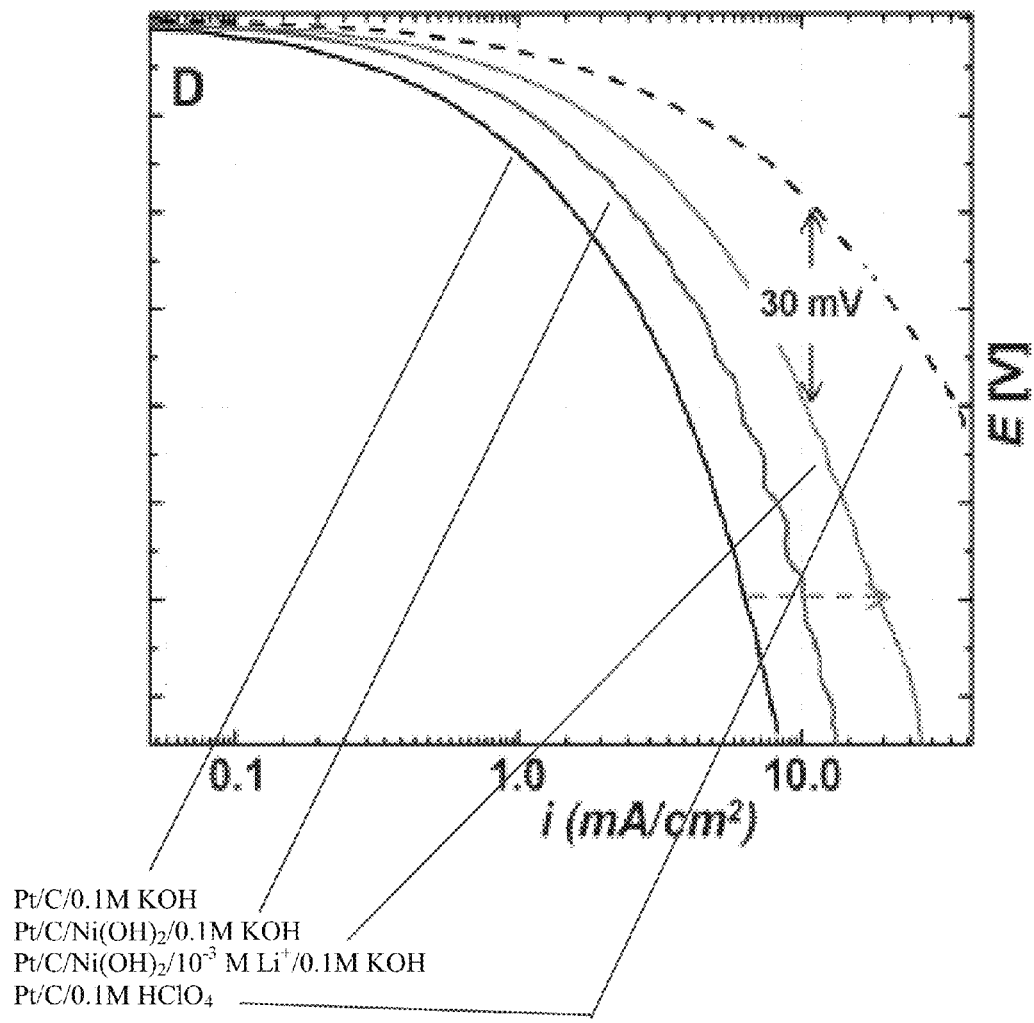
FIG. 9D is a comparison of HER activities with commercial nanocatalyst Pt/C (TKK) as the substrate. Incremental improvements in activities for the HER in 0.1 M KOH from unmodified Pt/C are shown for the hierarchical materials [surface covered with $Ni(OH)_2$] as the double layer (addition of $Li^+$ cations). The activity for the unmodified Pt/C surface in 0.1 M $HClO_4$ is shown for reference. Dashed arrow shows the activity trend. All the current densities for the TKK catalyst system are normalized by the geometric surface area of the glassy carbon substrate. In one implementation, the system depicted in FIGS. 9A-B was found to have the best activities for the HER in alkaline solutions to date.

The same guiding principles for accelerating the Volmer reaction step in alkaline solutions are equally applicable to Pt(110). The CV and STM data for the $Ni(OH)_2$/Pt-islands/Pt(110), are shown in FIG. 9A. The general characteristics (both structural and electrochemical) are similar to what was observed for the corresponding Pt(111) systems. The current densities for the HER on Pt(110) and Pt-nano systems are presented in the logarithmic Tafel form (FIGS. 9B and 9D). As expected, the systematic modification of Pt(110), first with Pt islands and then with Ni(OHh exhibits an HER activity trend (FIG. 9B) with the same order as the driving force for dissociative adsorption of water molecules, as discussed above for the Pt(111) systems: Pt(110)<Ni(OH)$_2$/Pt(110)<< Ni(OH)$_2$/Pt-islands/Pt(110). FIG. 9B As shown in FIG. 9B, at 10 mA/cm$^2$, the overpotential for the HER on Ni(OH)$_2$/Pt-islands/Pt(110) in the presence of L$^+$ is reduced by ~100 mV compared to bare Pt(110); From FIG. 9D this surface exhibits activities ~30 mV less than the activities Pt(110) recorded in acid solutions. The Tafel slopes lie in the range of 100-130 mV/dec, further emphasizing the role of Volmer step as the rate determining step for the HER in alkaline media. These results, in turn, verify the broad applicability of such a hierarchical catalyst design to various Pt extended surfaces.

Example 1C

Nanocrystals

Finally, to demonstrate the generality of the behavior exhibited by the extended single crystal surfaces, the hierarchical design approach was applied to real nanocatalysts. To verify the applicability of the approach for real electrocatalysts, conventional Tanaka Kikinzoku Kogyo (TKK) catalysts (5 nm Pt catalyst, FIG. 9C) were studied. Qualitatively similar trends were observed for nanocatalysts irrespective of shape or size variations, but the results for the carbon supported Pt catalysts are shown. Nanoparticles, by their very nature, generally have a significant surface density of low coordinated Pt sites and, consequently, no attempts were made to deposit Pt-islands on these nanoparticles. Materials for the electrode, such as Pt, which have low coordinated cites, including nanomaterials, allow for the preferential formation of Ni(OH)$_2$ clusters. As for extended surfaces, fractional coverage of Ni(OH)$_2$ was estimated to be ~15 to 20% based on the suppression of H$_{upd}$ on a Pt-nano surface covered by Ni(OH)$_2$ (FIG. 9C). Furthermore, the presence of Ni(OH)$_2$ on the Pt nanoparticles was confirmed by significant promotion of the HER (FIG. 9D); in particular, at 10 mA/cm$^2$, the difference in overpotential between a Pt-nano electrode in acid solution and a Li$^+$/Ni(OH)$_2$/Pt-nano interface in alkaline solution narrowed to 40 mV. The roughness factor for the system considered here defined as the ratio of actual area and the geometric area is ~6.5. The order of magnitude change observed in the HER activities ~50 times, for roughness factor change from 1 to 6.5 suggests that there is a significant scope of improvement in the overall activities by simply optimizing the surface area/volume ratios of these electrocatalysts.

Transition Metals

In one implementation catalysts are made from transition metals such as Ni, CO, Mn and Fe rather than noble metals. Transition metals are commercially less expensive and further lower the catalyst cost thereby aiding in the development of cost-effective efficient alkaline electrolyzers. This is achieved by using 3d-M hydr(oxy)oxides, with distinct stoichiometries and morphologies in the HER and the OER regions.

The limited conductivity of transition metal oxides often leads to undesired ohmic losses. In the past it has been countered with the use of very high loadings of catalysts, alloying the oxides as well as using conductive supports. However, given the high potentials at which the OER takes place, most support materials suffer from loss in conductivity thereby decreasing the overall reaction activity. This has sometimes been overcome with the use of more noble metal oxides such as that of Ru and Ir oxides. These oxides, while they provide high activities still suffer from undesired dissolution thereby limiting the applicability of these systems. The lack of clearly defined catalyst sites in conjunction with catalyst degradation over time has often posed significant challenges to the deployment of such materials into cost-effective electrolyzers. Currently RuIr oxides are used supported on a conductive titania. However, the dissolution issues have not been completely identified/understood and/or mitigated. However, the use of the methods of one embodiment to synthesize conductive oxides of the present invention offers a unique means to circumvent the use of noble metal oxides without suffering significant losses in activities. Also, it provides clearly defined active sites which opens up new avenues for design of catalyst materials, given the ability to achieve fundamental understanding regarding the catalytic mechanism. Such catalysts provide new flexibility where one can use an inert substrate such as Au or more active (moderately stable) substrate such as Ir. This helps to achieve significant OER activities with lower overall catalyst costs. Also, design of core-shell materials with the more noble metal species localized to the surfaces of the catalyst particles will further help in lowering the cost of these catalysts. Given that the active materials are 3d transition metal oxides, the cost of these catalysts can then be significantly lowered without significant compromise in performance at all levels.

Example 2

Non-Noble Metal Catalyst

It has been observed that the HER on a Ni electrode modified by Ni(OH)$_2$ nanoclusters is ~4 times higher than on bare Ni surfaces, thereby providing a means to enhance the activity of cost-effective catalysts for alkaline electrolyzers. The HER results for IB group metals (M=Cu, Ag, Au) as well for the Pt group metals (M=Ru, Ir, Pt) and transition metals (3d-TM=Ni, V, Ti) modified by Ni(OH)2 was tested.

Figure 10:
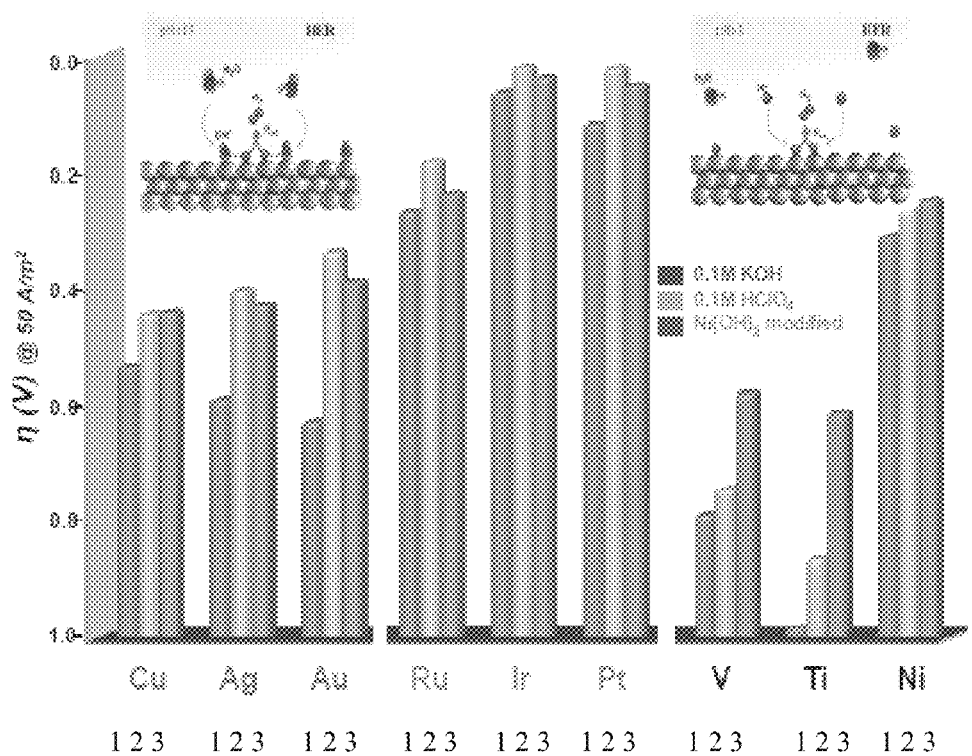
FIG. 10 is a comparison between activities for the HER expressed as overpotential required for 5 mA/cm$^2$ current densities, in 0.1 M HClO$_4$ and 0.1 M KOH for both bare metal surfaces and Ni(OH)$_2$ modified surfaces. Metals are grouped into three distinct groups, IB group (Cu, Ag, Au), the Pt-group metals (Pt, Ir, Ru) and the 3d-transition elements (V, Ti, Ni).

As summarized in FIG. 10, variations of HER activities in acid and alkaline environments will simply be expressed as the measured overpotential at a constant current density. For clarity, results will be clustered into three groups; IB group metals, Pt group metals and 3d-TM.

Experimental Procedure

Chemicals: Alkaline solutions were prepared from respective alkali salts (Multipharm, Sigma Aldrich, JT Baker and Alfa Aesar), perchloric acid from concentrated HClO4 (Sigma Aldrich) and Milli-Q de-ionized (DI) water. Pt, Ru, Ir, Au, Ag, Cu, Ti metal electrodes were 4N purity and 6 mm in diameter.

Pristine Electrodes Preparation:

The electrodes were prepared by radio frequency (RF) annealing at ~1100 OC (Pt, Ru, Ir), ~800 OC (Au, Ag, Cu), in a 3% H2-Ar gas mixture for 7 minutes. Ti was polished, and de-oxidized in strong acid prior to testing. The samples were transferred into the electrochemical cell with the surface protected with a drop of DI water and immersed under potential control at 0.05 V vs. reversible hydrogen electrode (RHE)

Oxide Modified Electrodes:

Ni(OH)$_2$ modified electrodes were prepared by chemical deposition, wherein, the pristine electrode samples were immersed and equilibrated in 0.01-0.1M NiCl$_2$ (Sigma Aldrich) solutions for 4-12 hrs, and washed thoroughly before being introduced into the electrolyte. The procedure, which was found to provide the desired oxide coverage, was used for all the materials. The time for the final oxide coverage was achieved by observing no change in both the HER activities. Typical coverages of 30-40% were obtained based on the H$_{upd}$ of the modified surface of Pt and Ir compared with that of the bare surfaces. Coverages on the surface of other elements are hard to detect electrochemically but preliminary XPS measurements reveal coverages ranging between ~30-50%. No attempt was made to control the coverages due to the lack of well-defined geometry or surface "chemistry". The coverage can be controlled by modifying the surface geometry (ad-islands), time of deposition, concentration of deposition, time of deposition and finally by changing the nature of the metal substrate.

Electrochemical Measurements:

A typical three electrode FEP cell was used to avoid contamination from glass components, for the RDE measurements. Ag/AgCl reference (−0.96 V vs. RHE), were used for electrochemical measurements. The counter electrodes used were Au (Au, Ag and Ti), Cu (for Cu) and Pt (Pt, Ru, Ir). The sweep rates used in the CV experiments were 50 mVsec-1, while the rotation rate was 1600 rpm. For the HOR and HER experiments the potential was swept in the cathodic direction from the hold potential; the data presented is taken from first sweep curves. IR compensations were applied for all the data reported here. Experiments were controlled using an Autolab PGSTAT 302N potentiostat. The gases used were research grade (5N) Ar and H2. The HER measurements were also performed at different scan rates (50 mV/s, 20 mV/s, 5 mV/s) with very little change in activity values reported. Also, rotating ring disc electrode (RRDE) measurements were performed for various systems to quantify the HER currents. For the ring electrode, with a collection efficiency of 21%, the currents from the ring and disc electrodes confirmed that all the currents measured were from the hydrogen evolution reaction and the contributions from other side reactions were negligible.

Example 2

Results

In acid environments (FIG. 10), three distinct relationships are noteworthy: (i) while there is no difference in the activities between Pt and Ir (presumably due to similar metal-Had energetics), Ru is the least active either due to strong Ru-Had interaction and/or the presence of oxygenated species even in the HER potential region; (ii) for the IB group elements, the activity trends increase in order Au>Ag>Cu, signaling that the HER activities may increase in the same order as the hydrogen adsorption energy on the IB group metals; (iii) considering that in electrochemical environments all of the 3d-TM elements are covered by oxides/hydroxides (with unknown stoichiometries) in varying degrees, the observed trends (Ni>V>Ti) may or may not correspond to the M-Had energetics. FIG. 10 inset illustrates 2-D representations of the mechanism involved with transformation of protons (pH=1) and water (pH=13) into H$_2$. IB group exhibits opposite trends in acid vs. alkaline solutions. Pt-group metals show no discernible difference in acid solution between Ir and Pt, but a much larger potential difference in alkaline solution. These differences are found to disappear when we compare the trends between acid and Ni(OH)$_2$/M surfaces in alkaline, confirming the role of water dissociation step. No clear understanding is possible for 3d transition metals due to the poorly defined surface properties of such materials which are often covered with "oxide" species. However, given the HER activity is enhanced for all these metals with the introduction of Ni(OH)$_2$, it is clear that the nature of the oxide species is important for the water dissociation step relevant for the HER.

Catalytic activity of the HER at high pH values can be simultaneously controlled by the M-Had bond strength as well as by the energy required to dissociate water into H and OH−. From FIG. 10 it is believed that: (i) activities in alkaline are significantly lower than in acid solutions, consistent with the observed inferior activities of the HER in alkaline solution; (ii) unlike in acidic media, in alkaline solutions the activity increases in the order Ir>Pt>Ru, suggesting that for a similar energy of hydrogen adsorption on Pt and Ir, the rate of Volmer step is enhanced on more oxophilic Ir; (iii) also, the activity trend for the IB metals is inverse to one found in acids (Cu>Ag>Au), signaling that the rate of reaction may be controlled by the dissociation energy of water rather than by the adsorption energy of hydrogen; and (iv) the order of activity of the 3d-elements is the same as in acidic environments, confirming that the nature as well as the coverage by surface oxides may be more important than the energy required for the water dissociation step. Based on these observations and keeping in mind that the M-Had binding energy should be pH-independent, it is believed that the rate of the water dissociation step must provide an important contribution to the observed pH-variations in activity trends. Consequently, then, for the catalysts with comparable M-Had energetics, improving the water dissociation step can improve the alkaline HER activities.

As noted above, the electrocatalytic trend for the HER has been established on 3d-TM(OH)$_2$/Pt "pseudo" mono-functional catalysts with Ni(OH)$_2$/Pt having the highest activity. Here, the bi-functionality of Ni(OH)$_2$/3d-TM can be transformed to a "pseudo" mono-functional type of catalysts, which is dependent on the substrate-Had interaction, akin to the acid HER. As shown in FIG. 10, the Ni(OH)$_2$/M surfaces are always more active (~3-5 fold) than on corresponding bare substrates. In turn, this suggests that, the edges of Ni(OH)$_2$ clusters do promote the dissociation of water and the generated hydrogen is "collected" and recombined on the substrate sites at a rate similar to that in acid solutions. On the basis of this, one should expect that reactivity trends on Ni(OH)$_2$/M catalysts should be very similar to one observed in acidic solutions. Indeed, the trends for the HER on IB metals established in acid solution are re-established in alkaline solutions on surfaces modified by Ni(OH)$_2$ (Au>Cu>Ag), implying that the rates are controlled again by the M-Had energetics. Furthermore, there is no discernible difference in activity between Ni(OH)$_2$/Pt and Ni(OH)$_2$/Ir, indicating that, as in acid solution, the HER is almost completely controlled by a similar hydrogen adsorption energy on these two surfaces.

Finally, the overpotentials for the HER on Ni(OH)$_2$/3d-TM is significantly smaller, depending on the nature of 3d elements, ranging from 0.2 to 0.5 V. It is believed that Ni(OH)2 serves to enhance the water dissociation step (it does do so on IB-group metals and Pt-group metals) and its ability is superior to that of the native oxide species present on the 3d-TM surfaces. The presence of Ni(OH)$_2$ on these 3d-TM systems was confirmed by analyzing X-ray absorption spectra (XAS) for the Ni(OH)$_2$N system. To determine the presence of the oxide species on the Ni electrode, ex situ X-ray photoelectron spectroscopy (XPS) analysis was performed. These results reveal two chemical states; the metallic state at 852 eV ($2p^{3/2}$) and 869 eV ($2p^{1/2}$) and the oxide state characterized by the binding energy of 855 eV ($2p^{3/2}$). Although XPS methods are not surface sensitive it may indicate that on the Ni electrode there are some metal sites that, in turn, may serve to "collect" and recombine the hydrogen atoms produced from the water dissociation step on Ni(OH)2 through a similar bifunctional mechanism.

Figure 11:
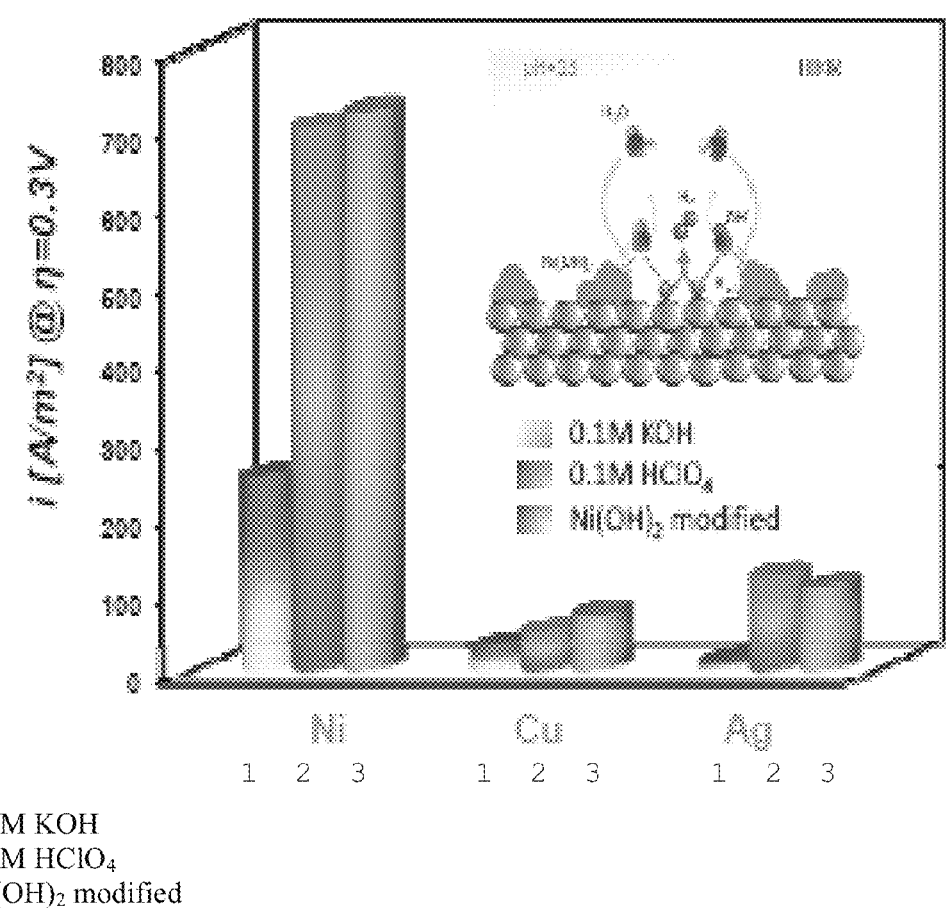
FIG. 11 is a chart of activity enhancement achieved by the introduction of bi-functionality via Ni(OH)$_2$ addition to the surface of metal M. Ni, Ag and Cu are shown here for comparison. Ni for being the most active, while Ag and Cu offer unique advantage of low cost and low affinity toward formation of hydrides, which has been known to decrease activities for the HER. Activities were measured from the first polarization scan, and the current densities at $\eta=0.3V$ are plotted.
Figure 12:
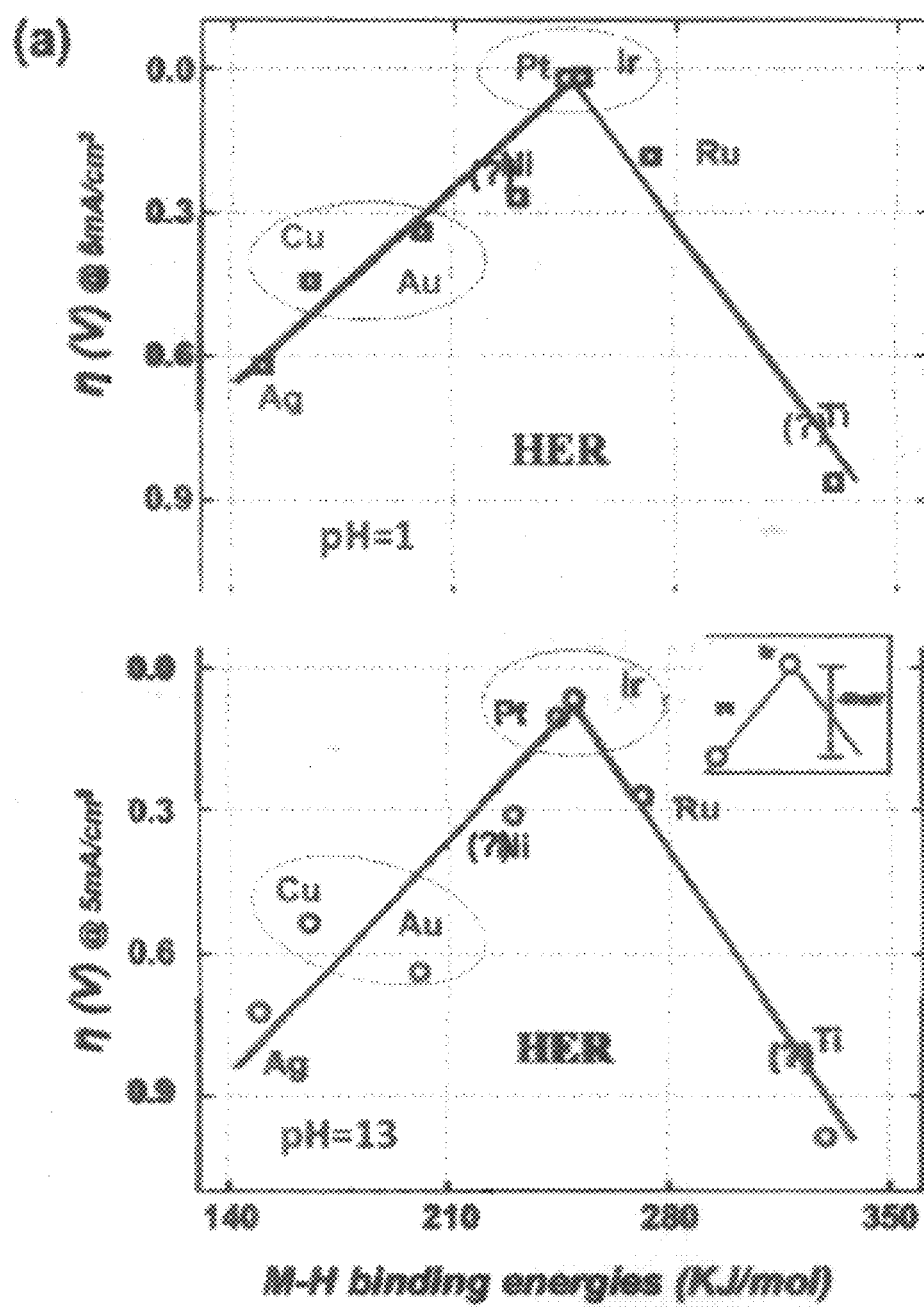
FIG. 12A illustrates a graph of activities for the HER, measured experimentally, plotted in the conventional volcano form for both acid and alkaline media. The activities exhibit a "volcano" trend, which match what has been reported in the literature for acid solutions.
FIG. 12B illustrates cyclic voltammograms of bare substrate Pt, Ir, and Ru, as well as substrate modified with Ni(OH)$_2$. The variation in pseudocapacitance for the individual metals is clear from the scale bars for the current densities. The relative coverages of Ni(OH)$_2$ is hard to determine due to the lack of clear $H_{upd}$ regions for more oxophilic materials (Ru, Ir). The Pt surface modified with Ni(OH)$_2$ was found to be ~12% covered for the CV shown.
Figure 12:
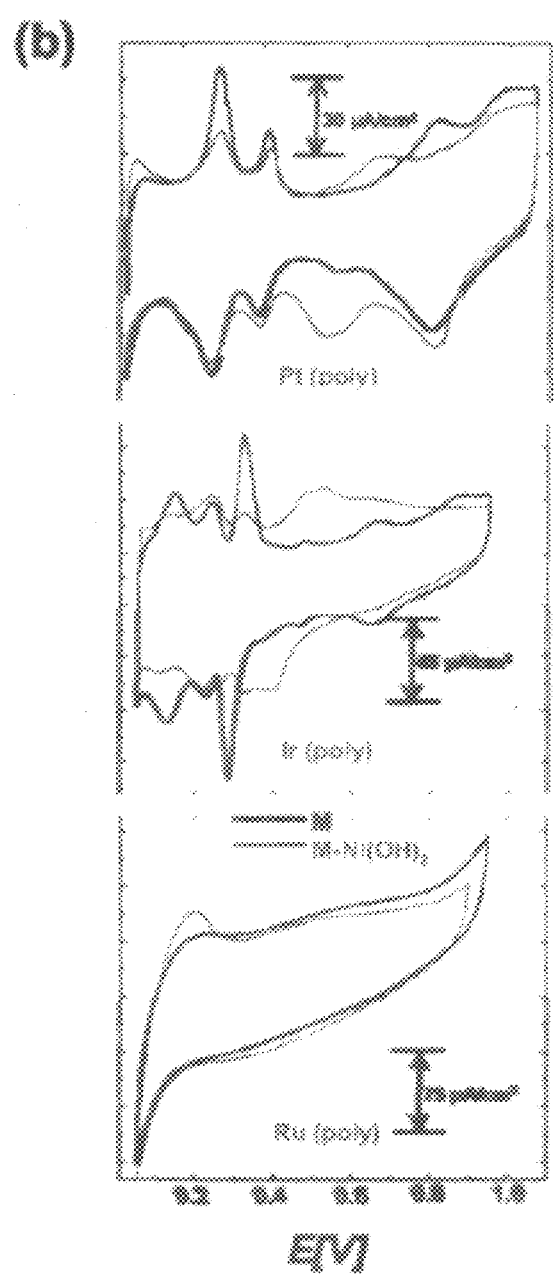

In certain embodiments, it is important to tailor the active sites for the HER in alkaline solutions. Ag and Cu have unique advantages due to the relatively low affinity toward formation of hydrides over long-term operations, while Ni offers the highest activity. Importantly, the results for the HER on Ag, Cu and Ni modified by Ni(OH)2 (FIG. 11) reveal that the activities of these surfaces nearly match those in acid solutions on un-modified electrodes. Furthermore the activity of Ni(OH)2/Ni is enhanced by a factor of 4 vs. the Ni(OH)2-free Ni surfaces, confirming that the nature of oxide species on the surface is critical. Thus, for some hydroxide modified "metal" surfaces the HER can be made even more active in alkaline solutions than in acid environments. This is particularly relevant for Ni, Ni alloys and Raney Ni, which are used as commercial catalysts in alkaline environments. Extending the bi-functional approach to such systems will, in turn, help further toward bridging the gap between noble and nonnoble HER "metal" catalysts, especially with the possibility of using higher loading of non-noble materials. For the HER in alkaline medium there is a synergy between the effectiveness of the catalyst to break water molecules and to efficiently form hydrogen that subsequently can be adsorbed and associated on metal surfaces.

The elements are arranged in the order of their oxophillicity from Mn to Ni. Pt is shown in the figure as a reference. Top inset—a comparison of the polarization curves Pt(111) and Pt(111) with 40% Cohydr (oxy)oxides for the CO oxidation reaction. As can clearly be seen, the onseen potentials CO oxidation are shifted ~300 mV negative from those of the bare Pt (111) surface. Bottom inset: a schematic showing the L-H mechanism for the CO oxidation reaction. CO from bulk is found to absorb on the free Pt site near the oxide clusters. $OH_{ad}$ is formed by either adsorption of $OH^-$ from the electrolyte and/or a change in oxidation state of the cluster cation $M^{2+\delta}$. In the presence of $CO_{ad}$ and $OH_{ad}$ in each others vicinity, reaction between $CO_{ad}$ and $OH_{ad}$ species the occurs forming an intermediate which is eventually converted to (bi)-carbonates. The free energy Pt—$CO_{ad}$ is fixed, which enables the treatment of these bi-functional metal-oxide/metal catalysts as a 'pseudo' mono-functional catalyst with a singular descriptor $OH_{ad}$-$M^{2+\delta}$ The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An electrode for use in a hydrogen evolution reaction, comprising:
   an electrode platinum substrate interactive with atomic hydrogen to adsorb atomic hydrogen;
   a plurality of nickel oxide or nickel hydroxide clusters directly deposited on the surface of the electrode platinum substrate as island shapes and interactive with water to dissociate hydrogen and hydroxide from water;
   wherein the electrode exhibits bifunctionality with respect to the hydrogen evolution reaction.

2. The electrode of claim 1, wherein the electrode platinum substrate comprises a plurality of low coordination areas on its surface.

3. The electrode of claim 2, wherein the low coordination areas comprise a plurality of surface defects.

4. The electrode of claim 3, wherein substantially all of the plurality of nickel oxide or nickel hydroxide clusters are deposited on the plurality of surface defects.

5. The electrode of claim 1, wherein the nickel oxide or nickel hydroxide consists essentially of $Ni(OH)_2$.

6. The electrode of claim 1, about 35% of the electrode is covered with deposited nickel oxide or nickel clusters.

7. The electrode of claim 1, wherein the nickel oxide or nickel hydroxide clusters have a height of about 0.7 nm and a width of about 8 nm to about 10 nm.

8. An electrolytic cell comprising:
   an anode;
   a cathode platinum substrate interactive with atomic hydrogen to adsorb atomic hydrogen and having a plurality of nickel oxide or nickel hydroxide clusters directly deposited on the surface of the cathode platinum substrate as island shapes and interactive with water to dissociate hydrogen and hydroxide from water;
   an electrolyte;
   wherein the cathode exhibits bifunctionality with respect to the hydrogen evolution reaction.

9. The electrolytic cell of claim 8, wherein the electrolyte is an alkaline electrolyte.

10. The electrolytic cell of claim 8, further comprising lithium ions.

11. The electrolytic cell of claim 8, wherein the cathode platinum substrate comprises a plurality of low coordination areas on its surface.

12. The electrolytic cell of claim 11, wherein the low coordination areas comprise a plurality of surface defects.

13. The electrolytic cell of claim 12, wherein substantially all of the plurality of nickel oxide or nickel hydroxide clusters are deposited on the plurality of surface defects.

14. The electrolytic cell of claim 8, wherein the nickel oxide or nickel hydroxide consists essentially of $Ni(OH)_2$.

15. An electrode for use in the hydrogen evolution reaction, comprising:
   an electrode platinum substrate;
   a plurality of metal oxide or metal hydroxide clusters directly deposited on the surface of the electrode platinum substrate as island shapes;
   where about 35% of the electrode is covered with deposited $Ni(OH)_2$ clusters.
   wherein the electrode exhibits bifunctionality with respect to the hydrogen evolution reaction.

* * * * *